US009833960B2

(12) United States Patent
Crudgington

(10) Patent No.: US 9,833,960 B2
(45) Date of Patent: Dec. 5, 2017

(54) SPILL RESISTANT DISPOSABLE TRAVEL CUP LID

(71) Applicant: Cleveland Benedict Crudgington, Monrovia, CA (US)

(72) Inventor: Cleveland Benedict Crudgington, Monrovia, CA (US)

( * ) Notice: Subject to any disclaimer, the term of this patent is extended or adjusted under 35 U.S.C. 154(b) by 0 days.

(21) Appl. No.: 14/597,011

(22) Filed: Jan. 14, 2015

(65) Prior Publication Data

US 2015/0191282 A1 Jul. 9, 2015

Related U.S. Application Data

(63) Continuation-in-part of application No. PCT/US2013/050562, filed on Jul. 15, 2013.
(Continued)

(51) Int. Cl.
*A47G 19/22* (2006.01)
*B29D 99/00* (2010.01)
(Continued)

(52) U.S. Cl.
CPC .......... *B29D 99/0096* (2013.01); *B29C 43/40* (2013.01); *B65D 43/0212* (2013.01);
(Continued)

(58) Field of Classification Search
CPC ................ B29D 99/0096; B29C 43/40; B29C 2043/3634; B29C 2043/3615; B65D 43/0212; B65D 2543/00092; B65D 2543/00296; B65D 2543/00796; B65D 2543/00527; B65D 2543/00537; B65D 2543/00731; B65D 2543/00046; A47G 19/2272
(Continued)

(56) References Cited

U.S. PATENT DOCUMENTS 5,839,601 A 11/1998 Van Melle
5,911,331 A * 6/1999 Boller ................ B65D 43/0256
220/254.3
(Continued)

FOREIGN PATENT DOCUMENTS

CN 101259886 A 9/2008
CN 201612437 U 10/2010
(Continued)

*Primary Examiner* — James N Smalley
(74) *Attorney, Agent, or Firm* — Seed IP Law Group LLP

(57) ABSTRACT

A disposable drink-through dome lid for disposable drinking cups used in the sale of hot or cold beverages, the top of the lid elevated above the top of the beverage cup when in place. The lid's outer wall is elevated to form a drink ridge adapted to the user's lips for drinking through a generally oval-shaped drink-through orifice. Ideally, the drink-through orifice includes: a drink-through chamber having a drink flap capable of closing off a drink-through opening, thereby shielding against accidental spillage due to sloshing of the beverage while traveling; and a recessed orifice ridge on the interior side of the drink-through orifice, directs froth exiting the drink opening into a spill reservoir. A vent opening positioned near the lid's center and within a vent slot, collects and directs beverage exiting the vent into the spill reservoir.

36 Claims, 14 Drawing Sheets

Related U.S. Application Data

(60) Provisional application No. 61/927,626, filed on Jan. 15, 2014, provisional application No. 61/774,471, filed on Mar. 7, 2013, provisional application No. 61/672,514, filed on Jul. 17, 2012.

(51) Int. Cl.
 *B65D 43/02* (2006.01)
 *B29C 43/40* (2006.01)
 *B29C 43/02* (2006.01)
 *B29C 43/36* (2006.01)

(52) U.S. Cl.
 CPC .... *B29C 43/021* (2013.01); *B29C 2043/3615* (2013.01); *B29C 2043/3634* (2013.01); *B65D 2543/00046* (2013.01); *B65D 2543/00092* (2013.01); *B65D 2543/00296* (2013.01); *B65D 2543/00527* (2013.01); *B65D 2543/00537* (2013.01); *B65D 2543/00731* (2013.01); *B65D 2543/00796* (2013.01)

(58) Field of Classification Search
 USPC ............ 220/254.3, 712–714; 229/404, 906.1
 See application file for complete search history.

(56) References Cited

U.S. PATENT DOCUMENTS

| | | | |
|---|---|---|---|
| 6,644,490 B2 | 11/2003 | Clark | |
| 6,824,003 B1 | 11/2004 | Wong | |
| 6,886,707 B2 | 5/2005 | Giraud | |
| 6,929,143 B2 | 8/2005 | Mazzarolo | |
| 7,134,566 B2 | 11/2006 | Smith et al. | |
| 7,591,393 B2 | 9/2009 | Crudgington | |
| 7,837,056 B2 | 11/2010 | Stribling et al. | |
| 8,235,236 B2 | 8/2012 | Zuares et al. | |
| 2003/0218017 A1 | 11/2003 | Schmidtner et al. | |
| 2005/0173443 A1 | 8/2005 | Crudgington | |
| 2006/0071008 A1 | 4/2006 | Sadlier | |
| 2007/0045316 A1 | 3/2007 | Amljots | |
| 2007/0051723 A1 | 3/2007 | Naesje | |
| 2008/0105696 A1 | 5/2008 | Dart et al. | |
| 2009/0065518 A1 | 3/2009 | Carnevali | |
| 2009/0212061 A1 | 8/2009 | Naesje | |
| 2009/0266828 A1 | 10/2009 | Cai et al. | |
| 2009/0308882 A1 | 12/2009 | Hundley | |
| 2010/0044386 A1 | 2/2010 | Samson | |
| 2010/0133272 A1 | 6/2010 | Whitaker et al. | |
| 2010/0264143 A1* | 10/2010 | Chrisman | B65D 47/04 220/254.3 |
| 2011/0049171 A1 | 3/2011 | Morgan | |
| 2013/0200088 A1 | 8/2013 | Muir, III | |

FOREIGN PATENT DOCUMENTS

| | | |
|---|---|---|
| CN | 101259886 B | 4/2011 |
| DE | 202005018994 U1 | 4/2007 |
| WO | 2013142160 A1 | 9/2013 |

\* cited by examiner

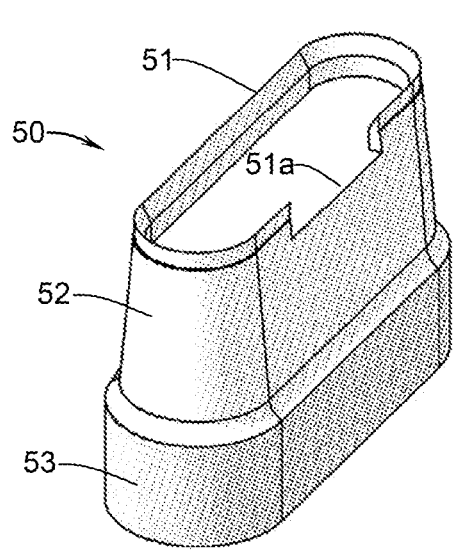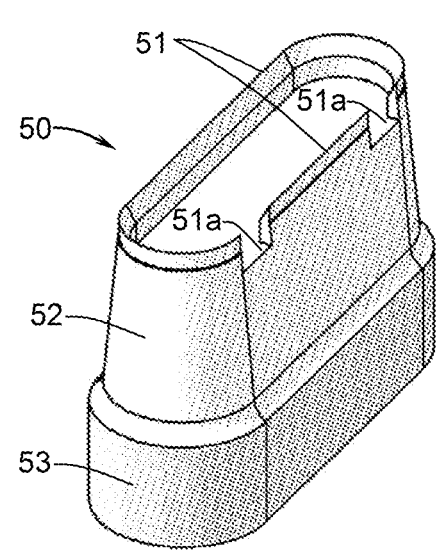
FIG. 14A    FIG. 14B
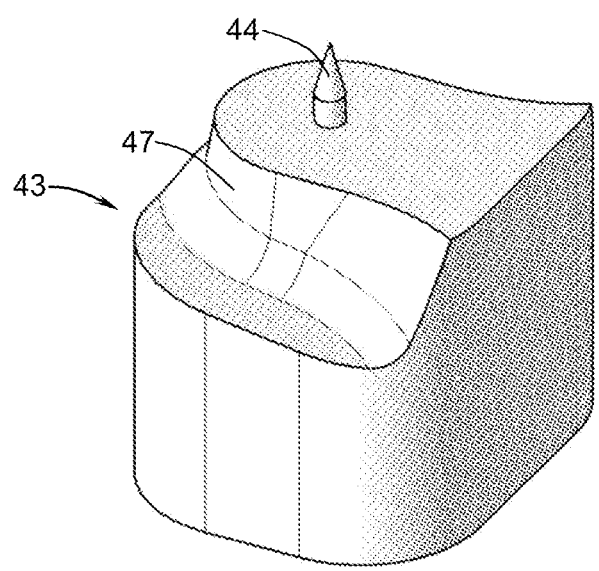
FIG. 15

SPILL RESISTANT DISPOSABLE TRAVEL CUP LID

RELATED U.S. APPLICATION DATA

Continuation-in-part of PCT/US/2013/050562 filed Jul. 15, 2013

Provisional application No. 61/927,626 filed Jan. 15, 2014, provisional application No. 61/774,471 filed Mar. 7, 2014, provisional application No. 61/672,514 filed Jul. 17, 2012

BACKGROUND

Technical Field

This disclosure relates to disposable lids for travel beverage cups and, more particularly, to disposable lids that may be placed over the lip of the cup and that provide a drink-through orifice near the perimeter of the lid's top surface so that a seal is formed by the user's mouth for easy drinking access to the beverage, and provide a vent opening so that air can be vented into the cup while the beverage is being consumed.

Description of the Related Art

With many consumers on the go, carryout beverages are more often than not intended to be consumed in moving vehicles, i.e., automobiles, airplanes, golf carts, boats, etc., or while walking, power walking and even jogging. Disposable lids of the kind that provide a seal between the user's mouth and a small drink-through opening have proven more suited for prevention of spills during consumption while on the move, than lids with a tear-off flap that exposes a large section for drinking. This observation is based on the widespread acceptance of this type of lid used by takeout food and drink establishments. And with the growing consumption of hot beverages intended to be consumed while on the move, the need for improvements that reduce spills has never been greater. Of greatest concern is the safety to the customer behind the steering wheel. Besides the annoyance of soiling one's clothing and vehicle interior, the sudden distraction caused by an accidental spill could result in an automobile accident and personal injury.

Prior disposable travel lids have several inherent shortcomings that are causes of accidental spills. The present disclosure addresses these issues:

Because of the airtight seal normally formed by the user's lips applied to a lid having a small drink-through opening, all disposable dome lids of this type require some means to vent air into the cup to displace the beverage being consumed. If air is not vented into the cup, or air vents too slowly into the cup, a partial vacuum is formed resulting in an undesired resistance to the flow of beverage being consumed. Typically, venting is provided by a pin-sized hole positioned on the lid's top wall opposite the drink-through opening. By positioning the vent hole in an exposed location such as near the edge of the lid's top wall, as is usually the case, the hole must be made very small in order to prevent liquid from accidentally spilling out and running down the side of the cup. However, even with a pin-sized vent hole, if the drink-through opening is plugged with a stopper then the beverage can be easily pushed out through the vent hole when a full disposable beverage cup is squeezed even slightly. This phenomena has become a concern because of the increased usage of the small plastic disposable stoppers that coffee houses now provide for their patrons taking their hot beverages to-go.

Coffee house patrons typically order frothed hot coffee and tea drinks for takeout. If the beverage is particularly frothy or if a full paper cup is squeezed even slightly, froth can bubble up through the drink-through opening. With the conventional disposable hot beverage lid, oftentimes the froth will flow over the lid's edge and down the side of the cup, thus producing another manner in which spills can occur. Coffee houses, in order to solve this problem, are known to instruct their baristas to fill the cup well below the cup's top, thus making it appear to the observant customer that the establishment is attempting to short-change its customers.

When a relatively full cup is jostled, as is often the case while moving about, the sloshing beverage is vulnerable to splashing out through the drink-through opening even when the drink opening is relatively small. Attempts have been made to address this concern by introducing devices to seal the drink-through opening when the beverage is not being consumed. However, previously presented disposable cup lids offer sealing methods that require manipulation to momentarily remove the sealing device so that the user is able to sip the beverage. While this methodology is practical if simply transporting the unconsumed beverage from one location to another, it is both cumbersome and impractical for occasional consumption while on the go. The present disclosure addresses this shortcoming by setting forth a novel implementation having a passive integrated barrier within the disposable cup lid that adequately seals the drink-through opening while the beverage is not being consumed, yet permits the consumer to drink from the cup in an enjoyable and satisfying manner.

Prior patents have identified concern for accidental spillage and have suggested means to provide a solution for sealing a disposable dome lid with a small drink-through opening: Clark, U.S. Pat. No. 6,644,490; Giraud, U.S. Pat. No. 6,886,707; Smith et al, U.S. Pat. No. 7,134,566; Zuares et al., U.S. Pat. No. 8,235,236; and others describe variations of a flexible arm having a closure member that requires manipulation in order to access and reseal the drink-through opening between sips. Wong, U.S. Pat. No. 6,824,003, describes a disposable dome lid having a sliding member that, when engaged by the user, can be slid back and forth to open or close the drink-through orifice between each sip of the beverage. While this concept in theory suggests an effective barrier to selectively seal the orifice, manufacturing costs may well prove the concept to be less desirable.

BRIEF SUMMARY

This disclosure sets forth a number of novel features for a disposable dome lid, each of which decreases the likelihood of accidental spills as well as increasing the comfort of the lid to the user's mouth. These features can be implemented alone or in combination to maximize the overall benefits.

Lattes and cappuccinos are made by pouring foamed hot milk on top of the coffee or tea. And if the takeout cup is particularly full, foam frequently bubbles up through the drink-through opening if the cup is jostled or squeezed even slightly. This disclosure introduces an orifice ridge that is recessed adjacent to the drink-through opening such that the perimeter of the drink-through orifice is lowest at its orifice ridge, thereby directing foam bubbling up through the drink-through opening to be directed into a spill reservoir.

Of particular importance is the introduction of a drink-through orifice that includes a flap configured to close off the drink-through opening while the user is not consuming the beverage. Thus, when a relatively full cup is jostled, the sloshing beverage is restricted from splashing out because the force applied to the underside of the lid by a sloshing liquid in an upright cup is considerably less than that created while the user takes a sip. When the user tilts the cup and takes a sip, the flap yields to the combined force of gravity "pushing" the beverage and the user gently "pulling" the beverage, and permits the beverage to flow through the drink-through orifice with sufficient ease to be a satisfying experience.

All of the features introduced in this disclosure can be incorporated in a variety of combinations to provide a disposable lid that not only reduces spills but a lid that users find more comfortable to their lips. The following described aspects of the present disclosure should not be construed to prevent or limit combinations of described features that have not been set forth.

A Centered Vent

In accordance with a first preferred aspect of the present disclosure, a lid that mounts on a cup for containing a beverage, the lid includes an exterior surface and an interior surface; a mounting portion that anchors on the cup; an outer side wall that extends upwardly and sloped radially inwardly from the mounting portion and terminates at a top; an outer top wall at the top of the outer side wall that encloses the top of the outer side wall; an inner side wall that extends downward from the outer top wall and slopes away from the outer wall; the inner and outer side walls and the outer top wall combine to define a drink ridge; a drink-through opening in the drink ridge, enables drinking from the cup without removal of the lid and permits a user's lips to encompass the drink-through opening, with the user's lower lip engaging with the outer side wall and the user's upper lip engaging with the inner side wall; an inner top wall below the outer top wall and at least partially bounded by the inner side wall, encloses an interior of the lid; a vent opening recessed within the inner top wall and positioned at or near the lid's center; the vent opening further positioned within a vent slot; the vent opening being for venting air into the cup during beverage consumption and the vent slot being for collecting liquid exiting through the vent opening and preferably for preventing the user's nose from blocking the vent opening; additionally, the lid preferably includes a spill reservoir bounded by the inner side wall and an interior side wall, being for capturing spills; and the vent slot being in fluid communication with the spill reservoir, directs collected liquid into the spill reservoir.

An Orifice Ridge

In accordance with a second preferred aspect of the present disclosure, a lid that mounts on a cup for containing a beverage, the lid includes an exterior surface and an interior surface; a mounting portion that anchors on the cup; an outer side wall sloping away upwardly and radially inwardly from the mounting portion and terminating at a top; an outer top wall at the top of the outer side wall that encloses the top of the outer side wall; an inner side wall extending downward from the top wall and sloping away from the outer wall; the inner and outer side walls and the top wall combining to define a drink ridge; a drink-through orifice defining a drink-through opening in the drink ridge that enables drinking from the cup without removal of the lid and that permits a user's lips to encompass the drink-through opening with user's lower lip engaging with the outer side wall and the user's upper lip engaging with the inner side wall; the inner side wall and the top wall adjacent to the drink-through orifice combining to form an orifice ridge; the segment of the drink-through orifice within the orifice ridge, is recessed below the remainder of the drink-through orifice, thereby directing a frothed portion of the beverage bubbling up through the drink-through opening, to flow over the orifice ridge and onto the inner side wall while the beverage cup is in a primarily upright position; preferably the lid includes a spill reservoir bounded by the inner side wall and an interior side wall, for capturing spills and providing additional room for the user's upper lip to engage with the inner side wall; and the spill reservoir collects the frothed portion flowing over the orifice ridge and onto the inner side wall.

A Drink Flap

In accordance with a third preferred aspect of the present disclosure, a lid that mounts on a cup for containing a beverage, the lid includes an exterior surface and an interior surface; a mounting portion that anchors on the cup; an outer side wall sloping away and radially inwardly from the mounting portion and terminating at a top; an outer top wall at the top of the outer side wall; an inner side wall extending from the top wall and sloping away from the outer side wall; the inner and outer side walls and the top wall together forming a drink ridge; a drink-through orifice in the drink ridge that enables drinking from the cup without removal of the lid, and that permits a user's lips to encompass the drink-through orifice with the user's lower lip engaging with the outer side wall and the user's upper lip engaging with the inner side wall; at least one drink flap within the drink-through orifice; upon the user tilting the cup and taking a sip of beverage, the drink flap(s) assume a non-relaxed and open position to provide a drink-through opening by the combination of a negative pressure applied by the user and the push of the beverage on the underside of the drink flap(s), that allows liquid to pass through the drink-through orifice with the cup in a tilted position; and the drink flap(s) otherwise remain in a relaxed and closed position to restrict the flow of a sloshing beverage from passing up through the drink-through orifice with the cup in a primarily upright position; the drink flap(s) preferably recessed within a drink-through chamber; the drink flap(s) in a chamber wall downwardly extending from the drink-through orifice; the drink-through chamber positioning the drink-flap(s) away from the user's casual view and the user's tongue during consumption of the beverage.

A Sloping Inner Top Wall

In accordance with a fourth preferred aspect of the present disclosure, a lid that mounts on a cup for containing a beverage, the lid includes an exterior surface and an interior surface; a mounting portion that anchors on the cup; an outer side wall sloping away upwardly and radially inwardly from the mounting portion and terminating at a top; an outer top wall at the top of the outer side wall that encloses the top of the outer side wall; an inner side wall extending downwardly from the outer top wall and sloping away from the outer side wall; the inner and outer side walls and the outer top wall combining to define a drink ridge; a drink-through orifice in the drink ridge that enables drinking from the cup without removal of the lid and that permits a user's lips to encompass the drink-through orifice with the user's lower lip engaging with the outer side wall and the user's upper lip engaging with the inner side wall; an inner top wall below the outer top wall and at least partially bounded by the inner side wall, encloses an interior of the lid; the inner top wall is typically horizontal, the user's comfort is enhanced by modifying the inner top wall with a primarily planer portion that slopes downwardly and away from the drink-through orifice, such that the greatest depth of the inner top wall in relation to the outer top wall is opposite the drink-through orifice, thereby providing additional room for the user's nose during consumption of the beverage.

A Pair of Beveled Recesses

In accordance with still yet a further preferred aspect of the present disclosure, a lid that mounts on a cup for containing a beverage, the lid includes an exterior surface and an interior surface; a mounting portion that anchors on the cup; an outer side wall sloping away upwardly and radially inwardly from the mounting portion and terminating at a top; preferably an outer top wall at the top of the outer side wall that encloses the top of the outer side wall; an inner side wall extending downwardly from the top wall and sloping away from the outer side wall; the inner and outer side walls and the top wall combining to define a drink ridge; a drink-through opening in the drink ridge that enables drinking from the cup without removal of the lid and that permits a user's lips to encompass the drink-through orifice with the user's lower lip engaging with the outer side wall and the user's upper lip engaging with the inner side wall; the user's comfort is further enhanced by providing a pair of beveled recesses that slope downwardly and inwardly within the inner side wall portion of the drink ridge; the beveled recesses are positioned on each side of the drink-through opening, generally at the two locations where the user's upper lip makes contact with the edge otherwise formed by the intersection of the inner side wall and the top of the drink ridge; thus in addition to providing a more comfortable lid, the beveled recesses provide an improved seal between the user's upper lip and the lid during consumption of the beverage.

A First Preferred Lid Configuration

A first preferred lid configuration having a desired combination of the preferred aspects of the present disclosure: a lid that mounts on a cup for containing a beverage, the lid includes an exterior surface and an interior surface; a mounting portion that anchors on the cup; an outer side wall sloping away upwardly and radially inwardly from the mounting portion and terminating at a top; an outer top wall at the top of the outer side wall that encloses the top of the outer side wall; an inner side wall extending downwardly from the top and sloping away from the outer side wall; an inner top wall below the outer top wall and at least partially bounded by the inner side wall, encloses an interior of the lid; the inner and outer side walls and outer top wall combining to define a drink ridge; a drink-through orifice in the drink ridge that enables drinking from the cup without removal of the lid, and that permits a user's lips to encompass the drink-through orifice with the user's lower lip engaging with the outer side wall and the user's upper lip engaging with the inner side wall; a chamber wall downwardly extending from the drink-through orifice to define a drink-through chamber in the drink ridge; the drink-through chamber having an open top in the drink ridge and having an enclosed base; and the drink-through chamber including at least one drink flap in the chamber wall, the drink flap(s) capable of opening in a non-relaxed position when a user is drinking through the drink-through orifice to allow the beverage to pass through the drink-through chamber and the drink-through orifice with the cup in a tilted position; the drink flap(s) to otherwise remain in a closed and relaxed position to restrict the flow of a sloshing beverage from passing up through the drink-through chamber and the drink-through orifice with the cup in a primarily upright position;

a spill reservoir bounded by the inner side wall and an interior side wall collects spills and provides additional vertical room for the user's upper lip to engage with the inner side wall; the interior side wall laterally bounded by the inner side wall, is arcuate in shape providing additional horizontal room for the user's upper lip; the user's comfort is further enhanced by providing a pair of beveled recesses in the drink ridge that slope downwardly and inwardly within the inner side wall; the beveled recesses are positioned on each side of the drink-through orifice, generally at the two locations where the user's upper lip makes contact with the edge typically formed by the intersection of the inner side wall and the outer top wall; thus, in addition to being more comfortable, the beveled recesses provide an improved seal between the user's upper lip and the lid;

the user's comfort is further enhanced by modifying the typically horizontal inner top wall; in a preferred configuration a primarily planar portion slopes downwardly and away from the drink-through orifice such that the greatest depth of the inner top wall in relation to the outer top wall is opposite the drink-through orifice thereby providing additional room for the user's nose during consumption of the beverage;

a vent slot recessed within the inner top wall is in fluid communication with the spill reservoir; and a vent opening within a base of the vent slot is positioned at or near the lid's center; the vent opening vents air into the cup during beverage consumption and the vent slot directs liquid exiting through the vent opening into the spill reservoir and prevents the user's nose from blocking the vent opening;

the inner side wall and the outer top wall adjacent to the drink-through orifice combining to form an orifice ridge; the segment of the drink-through orifice within the orifice ridge, is recessed below the remainder of the drink-through orifice, thereby directing a frothed portion of the beverage bubbling up through the drink-through opening, to flow over the orifice ridge and into the spill reservoir.

A Second Preferred Lid Configuration

A second preferred lid configuration having a desired combination of the preferred aspects of the present disclosure: a lid that mounts on a cup for containing a beverage, the lid includes an exterior surface and an interior surface; a mounting portion that anchors on the cup; an outer side wall sloping away upwardly and radially inwardly from the mounting portion and terminating at a top; an outer top wall at the top of the outer side wall that encloses the top of the outer side wall; an inner side wall extending downwardly from the outer top wall and sloping away from the outer side wall; an inner top wall below the outer top wall and at least partially bounded by the inner side wall, encloses an interior of the lid; the inner and outer side walls and the outer top wall combining to define a drink ridge; a drink-through orifice in the drink ridge that enables drinking from the cup without removal of the lid, and that permits a user's lips to encompass the drink-through orifice with the user's lower lip engaging with the outer side wall and the user's upper lip engaging with the inner side wall; a chamber wall downwardly extending from the drink-through orifice to define a drink-through opening at a base of the chamber wall, the base being primarily planar and horizontal; the drink-through opening being in fluid communication with the drink-through orifice thereby allowing liquid to pass through the drink-through orifice;

a spill reservoir bounded by the inner side wall and an interior side wall collects spills and provides additional vertical room for the user's upper lip to engage with the inner side wall; the interior side wall laterally bounded by the inner side wall, is arcuate in shape providing additional horizontal room for the user's upper lip; the user's comfort is further enhanced by providing a pair of beveled recesses in the drink ridge that slope downwardly and inwardly within the inner side wall; the beveled recesses are positioned on each side of the drink-through orifice, generally at the two locations where the user's upper lip makes contact with the edge typically formed by the intersection of the inner side wall and the outer top wall; thus, in addition to being more comfortable, the beveled recesses provide an improved seal between the user's upper lip and the lid;

the user's comfort is further enhanced by modifying the typically horizontal inner top wall; in a preferred configuration a primarily planar portion slopes downwardly and away from the drink-through orifice such that the greatest depth of the inner top wall in relation to the outer top wall is opposite the drink-through orifice thereby providing additional room for the user's nose during consumption of the beverage;

a vent slot recessed within the inner top wall is in fluid communication with the spill reservoir; and a vent opening within a base of the vent slot is positioned at or near the lid's center; the vent opening vents air into the cup during beverage consumption and the vent slot directs liquid exiting through the vent opening into the spill reservoir and prevents the user's nose from blocking the vent opening;

the inner side wall and the outer top wall adjacent to the drink-through orifice combining to form an orifice ridge; the portion of the drink-through orifice within the orifice ridge, is recessed below the remaining portion of the drink-through orifice thereby directing a frothed beverage bubbling up through the drink-through opening to flow over the orifice ridge and into the spill reservoir.

A Method for Cutting into the Base of a Chamber

In accordance with a further aspect of the present disclosure, a method of forming and cutting a lid for a cup is provided: the method including: providing a support plate that is shaped in the form of a lid and is configured to serve as a mold to vacuum-form thermoplastic material, the support plate further configured to provide multiple planar receiving surfaces for die cutting; providing a mounting plate with cutting tools that includes a block die; forming thermoplastic material onto the support plate vacuum into a lid shape and having a drink-through chamber formed thereon; and bringing the block die into contact with the lid-shaped vacuum-formed thermoplastic material, with the block die cutting into the wall of the drink-through chamber.

A Method for a Self-Positioning Block Die

In accordance with another aspect of the present disclosure, a method of forming and cutting a lid for a cup is provided, the method including: providing a support plate that is shaped in the form of a lid and is configured to serve as a mold to vacuum-form thermoplastic material, the support plate further configured to provide multiple planar receiving surfaces for die cutting; providing a mounting plate with cutting tools that includes a block die, the mounting plate further defined by a block die drink-through chamber having a laterally and radially positioned mounting slot, the block die further defined by a laterally and radially positioned flange member and a contoured portion; mounting the block die within the block die drink-through chamber such that the flange member is located within the mounting slot, the block die being permitted to slide in a first direction with respect to the mounting plate and prevented from moving in a second direction that is transverse with respect to the first direction; forming a lid with a drink-through chamber by vacuum-forming the thermoplastic material on the support plate, the lid including a drink-through chamber, the drink-through chamber having a downwardly and inwardly sloping chamber side wall that terminates at a drink-through chamber bottom wall; and the method including guiding the block die into position for cutting into the drink-through chamber bottom by the contoured portion of the block die contacting the chamber side wall and moving in the first direction prior to cutting into the drink-through chamber bottom wall.

A Method for a Self-Positioning Block Die Mounting Plate

In accordance with yet another aspect of the present disclosure, a method of forming and cutting a lid for a cup is provided, the method including: providing a support plate that is shaped in the form of a lid and is configured to serve as a mold to vacuum-form thermoplastic material, the support plate further configured to provide multiple planar receiving surfaces for die cutting; providing a mounting plate with cutting tools that includes a contoured ring die; the mounting plate positioned within a mounting plate chamber within the support plate; the mounting plate further defined by a laterally and radially positioned flange member that inserts within a mounting slot in the mounting plate chamber; the mounting plate being permitted to slide in a first direction with respect to the mounting plate base and prevented from moving in a second direction that is transverse with respect to the first direction; forming a lid having a downwardly and outwardly sloping outer side wall; and the method including guiding the mounting plate into position for cutting into the lid-shaped thermoplastic material by the contoured portion of the ring die contacting the outer side wall and moving in the first direction prior to cutting the thermoplastic material.

BRIEF DESCRIPTION OF THE DRAWINGS

The foregoing and other features and advantages of the present disclosure will be more readily appreciated as the same become better understood from the following detailed description when taken in conjunction with the accompanying drawings. It should be understood that the preferred implementations are to be considered in all respects illustrative and not restrictive, wherein:

FIGS. 14A-14B illustrate the proposed drink-through chamber block die depicted in FIGS. 12 and 13 for cutting the two drink flap configurations shown in FIGS. 5A and 5B;

FIG. 15 is an isometric view of the proposed vent block die depicted in FIG. 12 for cutting the vent opening shown in FIGS. 1, 3 and 10;

DETAILED DESCRIPTION

Figure 1:
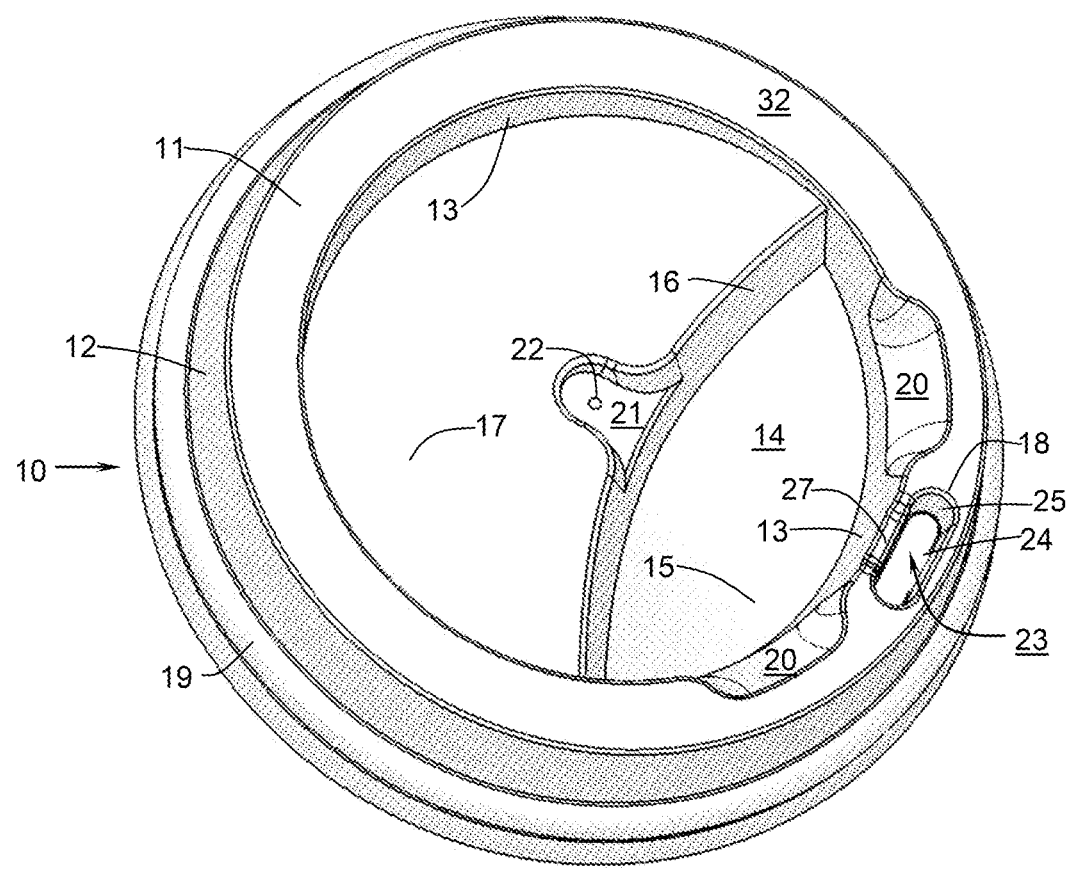
FIG. 1 is an isometric view illustrating a disposable cup lid in accordance with one example implementation of the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with drinking cups, including but not limited to disposable drinking cups formed of paper, plastic, and the like, have not been shown or described in order to avoid unnecessarily obscuring descriptions of the implementations.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

All of the independent implementations in this disclosure can be applied individually or in combination to improve any disposable dome having a small drink-through orifice near the lid's perimeter. All disposable dome lids, usually vacuum formed from thin-walled thermoplastic sheets, are designed to grip and seal upon an outwardly projecting ridge formed at the lip of disposable cups usually made from cardboard. Two methods for attaching disposable dome lids to cups have been described or illustrated in the art and are commonly used in practice. An original method referred to as the "ridge fit" provides an outwardly projecting annular ridge around the lid's apron that snaps into place when pushed over and mating with the cup's lip. The cup's lip has a slightly larger diameter than the lid's mounting ridge. Flexibility of the materials permits the apron to slide over the cup's lip and provide a liquid-tight seal. A more recently developed method of attachment utilizes an inverted groove surrounding the lid's base, forming what is referred to as a "groove fit." The lid is attached by "plugging" the cup's lip into the groove. There are advantages and disadvantages to each method of attachment. And even though only one method of attaching a disposable dome-shaped lid to a travel cup is selected for illustration purposes, all implementations in this disclosure can be applied to either of these known methods and most likely any other method of attaching a disposable dome-shaped lid to a travel cup.

U.S. Pat. No. 7,591,393 sets forth a vent hole positioned within a channel in the bottom wall of a large recess in a lid's top wall that provides additional room for the user's upper lip. This recess, also referred to as a spill cavity or spill reservoir, is ideal for capturing any liquid spilling out from either vent or drink-through openings. This disclosure improves venting by repositioning a vent opening approximately at the center of the lid's perimeter, the location of the lid least affected by a sloshing beverage. Additionally, venting is further improved by elevating the vent opening from the bottom of the spill reservoir to a level at or near the inner top wall of the lid. By raising the vent opening, a frothed beverage within a relatively full cup is less likely to bubble up through the vent opening.

Figure 2:
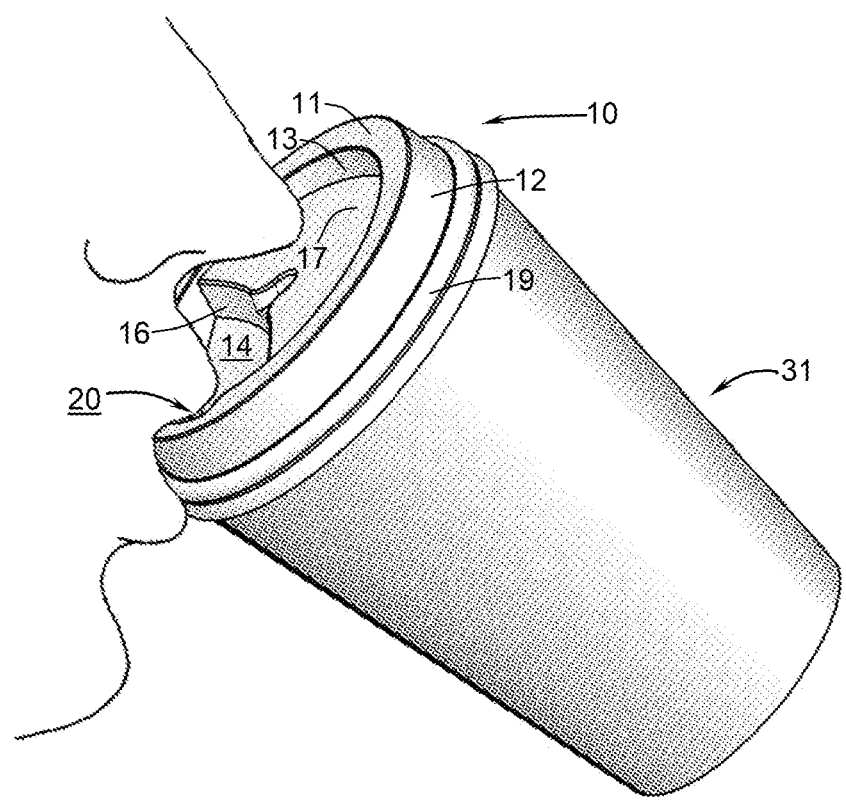
FIG. 2 is an isometric view illustrating the disposable lid mounted upon a beverage cup with the profile of a user's mouth engaged with the lid in the process of beverage consumption.

FIG. 1 illustrates a preferred spill resistant disposable drink-through dome-shaped thin-walled lid 10 for cup containing a beverage. The lid 10 includes an outer side wall 12 extending upwardly and sloping inwardly from a mounting portion 19, and terminating at a top 11, usually configured into an outer top wall 11, the mounting portion 19 is formed at or near the base of the lid 10 in order to affix the lid 10 to the lip at the rim of a typical disposable drinking cup 31 shown in FIG. 2. An inner side wall 13 extending downwardly from the top 11, at least partially circumscribes the lid. The top 11, the outer side wall 12 and the inner side wall 13 combine to form a drink ridge 32. A spill reservoir 14 bounded by the inner side wall 13 and an interior side wall 16, is further defined by a bottom wall 15, preferably sloping gently upwardly and inwardly and terminating at a base of the interior side wall 16. The interior side wall 16, laterally bounded by the inner side wall 13 and preferably arcuate in shape, slopes upwardly and inwardly at a substantially steeper angle than the bottom wall 15, and terminates at an inner top wall 17. The inner top wall 17 encloses an interior of the lid 10, the inner top wall 17 is below the outer top wall 11 and bounded at least partially by the inner side wall 13. A drink-through orifice 18 within the drink ridge 32 aligns with the spill reservoir 14.

By providing a lid 10 that conforms to the facial anatomy of a range of users, the user not only experiences the lid being more comfortable, but the lid 10 is less likely to cause spills while the beverage is being consumed, by improving the seal between the user's mouth and the lid 10. Besides collecting spills, the spill reservoir 14 accommodates the user's upper lip by deepening the inner side wall 13 at the drink-through orifice 18. Besides being visually appealing, the spill reservoir's interior side wall 16 is preferably formed into an arcuate shape, thereby providing additional horizontal room for the user's upper lip while only marginally reducing the volume contained within the underside of the dome lid 10. The user's lower lip is also accommodated by having the outer side wall 12 raised sufficiently so the user's lower lip generally clears the mounting portion 19. As most clearly viewed in FIG. 2, the inner top wall 17 is recessed slightly below the outer top wall 11 at its juncture with the interior side wall 16, and in its preferred configuration slopes downwardly and away from the spill reservoir 14. Thus, a portion of the inner top wall 17 is deepened to provide additional room for the user's nose. Again referring to FIG. 1, the user's comfort is further enhanced by the providing of a pair of beveled recesses 20 that slope downwardly and inwardly within the juncture of the outer top wall 11 and the inner side wall 13. The beveled recesses 20 are positioned on each side of the drink-through orifice 18, generally at the two locations where the user's upper lip makes contact with the edge otherwise formed by the intersection of the inner side wall 13 and the outer top wall 11.

Because of the seal formed by the user's mouth, this type of disposable lid requires a means to vent air through the lid and into the cup 31 during beverage consumption. A vent, usually in the shape of a small hole, is typically placed within the lid's inner top wall 17 on the side opposite the drink-through orifice 18 (typical vent position not illustrated). By placing a vent opening as such, the venting capacity is restricted to its usual pin-sized hole to prevent the beverage from accidentally exiting the vent and running down the side of the lid 10. The center of any cylindrical or conical shaped beverage container is an ideal location for venting. Since cups and lids of the disposable type are typically round, the center of the lid 10 is at the center of the perimeter defined by the mounting portion 19. When a full container is jostled, the surface level of the beverage remains relatively constant at its center, while the surrounding surface of the liquid fluctuates significantly, often sloshing against the underside of the lid's periphery. Also, when a full container is tilted either accidentally or for beverage consumption, the beverage usually does not touch the underside of the lid 10 at its center but usually contacts the underside of the lid 10 at its periphery.

Figure 3:
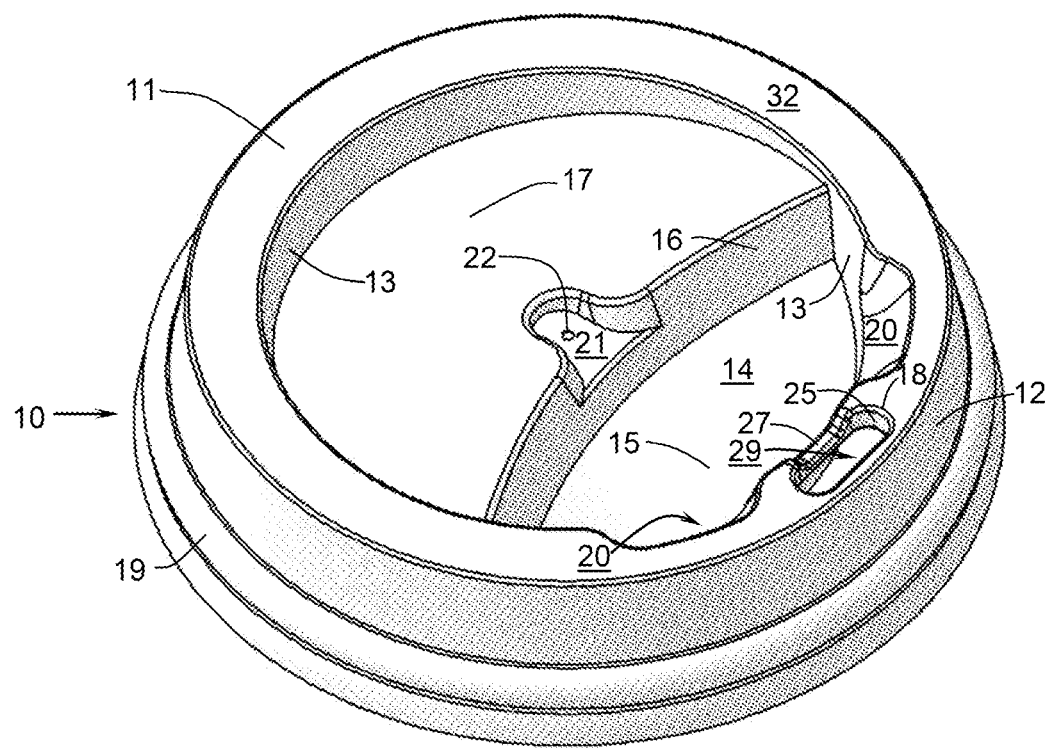
FIG. 3 is a top isometric view illustrating the disposable cup lid with a spill reservoir including a centered vent within a vent slot and a recessed interior orifice ridge both in fluid communication with the spill reservoir.
Figure 9:
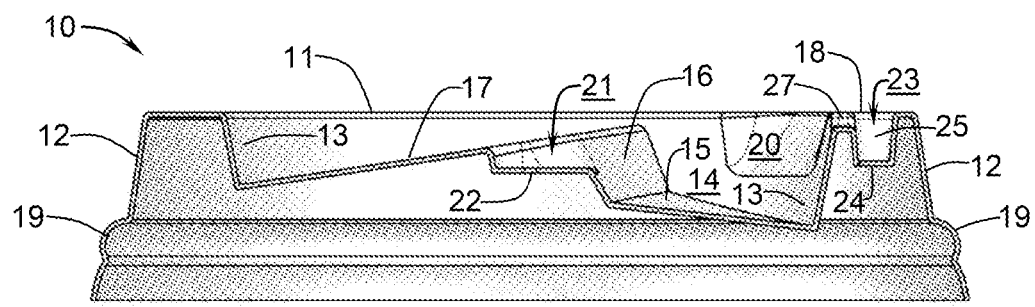
FIG. 9 is a cross-sectional side view illustrating the disposable cup lid shown in FIG. 1.

By positioning a vent opening 22 at or near the center of the lid 10 within the inner top wall 17, the size of the vent opening 22 can be increased, thereby improving the capacity of air entering the cup 31 and the ease at which the beverage can be withdrawn from the cup 31. The center of the lid 10 being defined as the center of the outermost perimeter of the lid 10. Besides being approximately centered in lid 10, the vent opening 22 is preferably in the shape of a small hole and located within a base of a vent slot 21; the vent slot 21 is recessed within the inner top wall 17 and in fluid communication with the spill reservoir 14 as shown in FIGS. 1, 3 and 9. The vent slot 21 is bounded by the inner top wall 17 and open to the interior wall 16, thereby directing fluid that inadvertently exits the vent opening 22 to flow into the spill reservoir 14 where it is safely held. In its preferred configuration, the vent slot 21 is sufficiently narrow where meeting the interior side wall 16 to prevent the user's nose from blocking the vent opening 22. It should be noted that a drain within the spill reservoir 14 is unnecessary since the user, without giving a second thought, will consume any residue from the spill reservoir when tilting their cup 31 for the next sip of the beverage.

Figure 4:
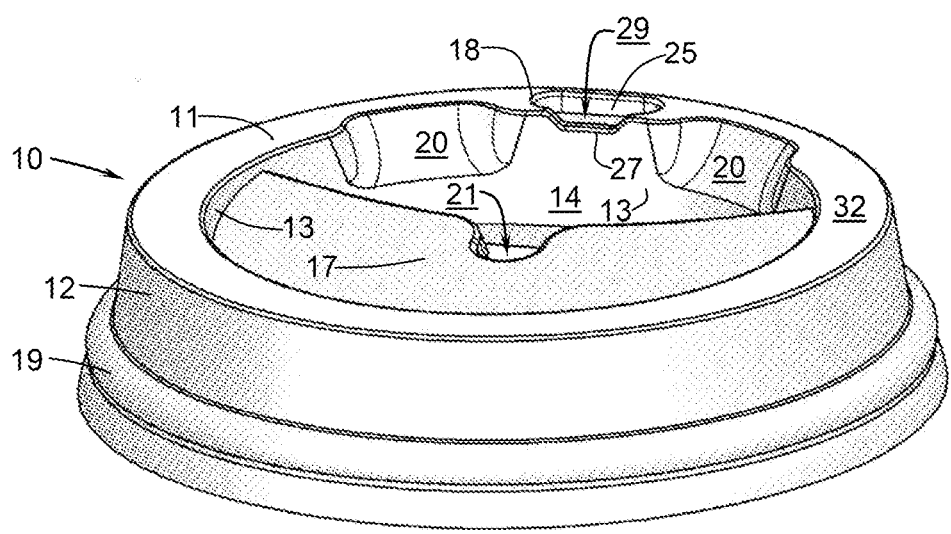
FIG. 4 is a rear isometric view illustrating the disposable cup lid with a spill reservoir including a vent slot and a recessed interior orifice ridge both in fluid communication with the spill reservoir.

FIGS. 3 and 4 illustrate one preferred combination of features for the lid 10. A chamber wall 25 extends downwardly from the drink-through orifice 18 to define a drink-through opening 29 below the drink-through orifice. On occasion, froth from the beverage, such as from whipped milk or cream, bubbles up through the drink-through opening 29, thus providing another manner in which spills occur where froth runs over the outer side wall 12 of the lid 10. An interior portion of the drink ridge 32 adjacent to the drink-through orifice 18 defines an orifice ridge 27. Another implementation of this disclosure is the recessing of the orifice ridge 27 such that the segment of the drink-through orifice 18 within the orifice ridge 27, is recessed below the remainder of the drink-through orifice 18, as best visualized in FIG. 4. Thus, froth bubbling up through the drink-through orifice 18, is directed to flow over the orifice ridge 27 and onto the interior of the lid 10 and then into the spill reservoir 14 while the cup 31 is in a primarily upright position. Incidentally, any froth that happens to collect within the spill reservoir 14 is conveniently consumed upon the user tilting the cup 31 to take the next sip of their beverage. Furthermore, the inclusion of the chamber wall 25 not only provides a more finished look to the drink-through orifice 18 but enables the drink-through opening 29 to be cut out from the surrounding lid 10 with a horizontally planar cutting tool, a preferred cutting configuration.

Figures 5A, 5B:
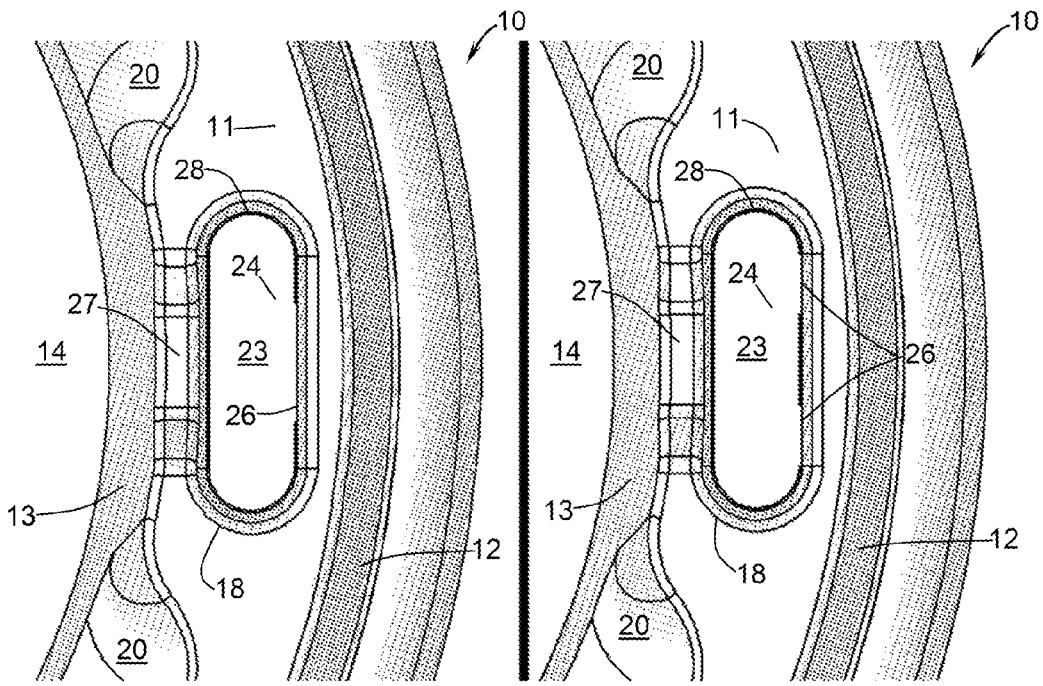
FIGS. 5A and 5B illustrate two preferred drink flap configurations in a relaxed position and closed position, respectively.

FIGS. 5A and 5B are illustrations detailing the preferred drink-through orifice 18 and another implementation of this disclosure. The chamber wall 25 extending downwardly from the drink-through orifice 18, also extends inwardly and encloses on itself to form a drink-through chamber 23. In the preferred configuration, the shape of the drink-through orifice 18 is defined by a pair of parallel linear edges connected by a pair of opposing semi-circular edges. Thus, the chamber wall 25 comprises a pair of opposing planar surfaces connected by a pair of opposing arcuate surfaces. A drink flap or drink flaps 24 are included within the drink-through orifice 18, the drink flap or drink flaps 24 can function properly without adding the drink-through chamber 23 by being aligned with the outer top wall 11. Henceforth, describing the drink flap 24 in the singular also includes the multiple. But preferably the drink flap 24 is within the chamber wall 25 and positioned at or near a base of the drink-through chamber 23 below the drink-through orifice 18 and away from the user's casual view and the user's tongue during consumption of a beverage. In a preferred configuration the drink flap 24 is generally shaped planar and horizontal, thereby permitting cutting with a horizontally planar cutting tool. When the drink flap 24 is in its relaxed position, as most clearly shown in FIG. 6, the drink-through orifice 18 is closed off thereby restricting a sloshing beverage within a primarily upright cup 31 from exiting the drink-through chamber 23. When the user is consuming the beverage, a negative air pressure is applied to the drink-through chamber 23 by the user, and a positive hydraulic pressure is applied to the drink-through chamber 23 with the beverage pressing against the lid 10 while the cup 31 is in a tilted position. The combined forces cause the drink flap 24 to assume a non-relaxed position, and the resulting drink-through opening 29 permits the beverage to flow through the drink-through orifice 18.

Except for the recessing of the orifice ridge 27, the drink-through orifice 18 remains visually integrated within the dome cup lid 10 by preserving the curvature of the outer and inner side walls 12 and 13, and by preserving the height of the outer top wall 11 surrounding the drink-through orifice 18. By recessing the drink flap 24 below the drink-through orifice 18 in the drink-through chamber 23, the drink flap 24 along with its functioning, is essentially hidden from view of the casual observer and away from the user's tongue during consumption of a beverage. The drink flap 24 is created by stamping a cut line into the chamber wall 25 using die cutting methods adaptable to the industry. The drink flap 24 preferably follows the contour of the base of the chamber wall 25 in order to maximize its size and the resulting flow of beverage. The drink flap 24 is formed by cutting only partially around the perimeter, with the uncut portion becoming the hinged portion, referred to as a living hinge 26, and is preferably along one of the two linear edges within the base of the drink-through chamber 23. FIGS. 5A and 5B illustrate two possible preferable configurations for the living hinge 26. Incidentally, the permanent drink-through opening 29 shown in FIGS. 3 and 4 is created by cutting around the entire perimeter of the chamber wall 25, thus eliminating the drink flap 24 implementation.

Figure 7:
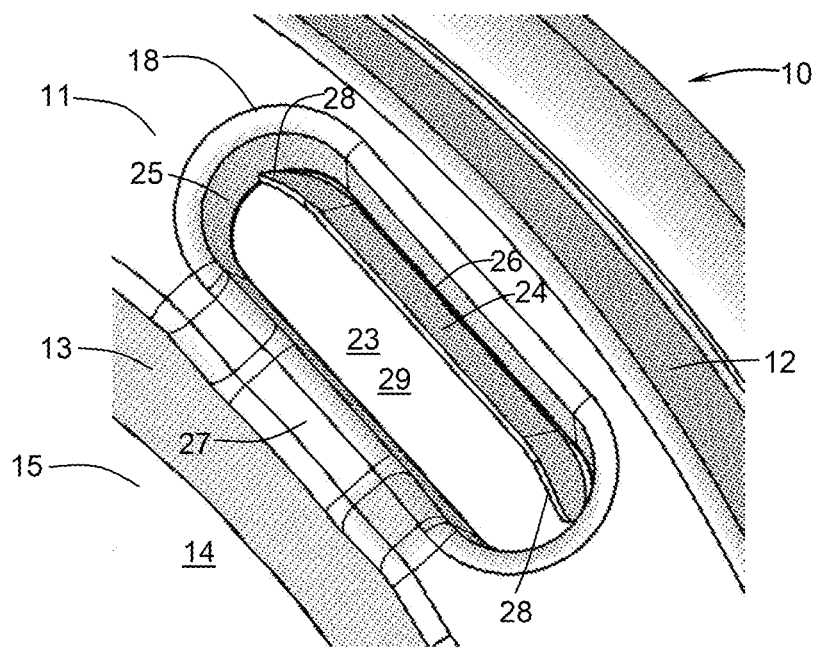
FIG. 7 is a fragmentary isometric view featuring the drink-through orifice with the drink flap of FIG. 5A folded upward in the open and non-relaxed position as it would be during consumption of the beverage.
Figure 8:
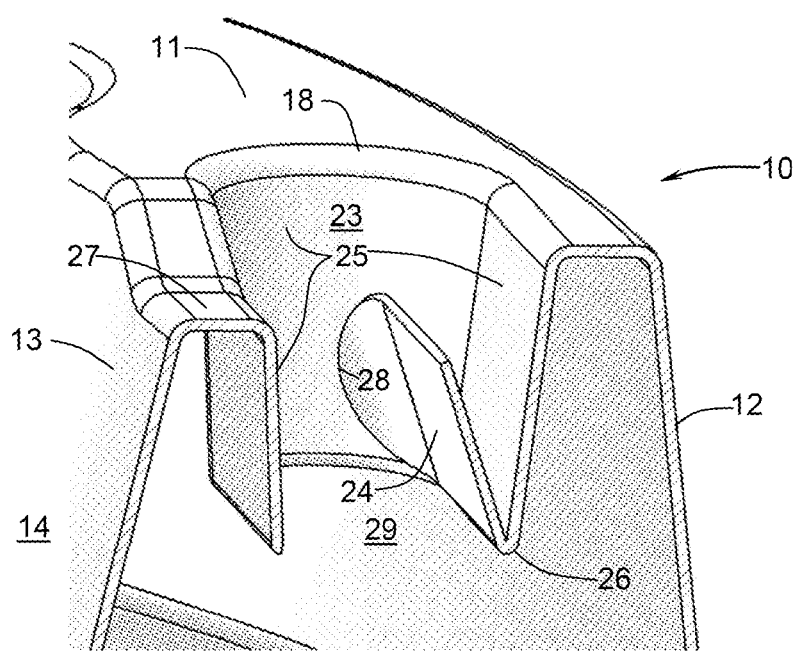
FIG. 8 is a fragmentary cross-sectional isometric view of the drink-through orifice of FIG. 7 illustrating the drink flap in an opened and un-relaxed position.

The thermo-plastic material commonly used to form disposable cup lids is sufficiently flexible to provide a living hinge that bends yet is sufficiently rigid to resist bending. Thus a force must be applied to the drink flap 24 in order for the living hinge 26 to bend, thereby exposing the drink-through opening 29 as shown in FIGS. 7 and 8. When molding thermo-formed plastic sheets, the thickness of the material varies from one segment of the part to the next, tending to thin while forming into the downward extensions. In the present disclosure, one of the thinnest segments of the lid 10 is located at the base of the drink-through chamber 23. Because the material is inherently more flexible where thinner, by positioning the drink flap 24 at the base of the drink-through chamber 23, the living hinge 26 can be made to fold inward when the user takes a sip of the beverage. The force required for the drink flap 24 to open can be adjusted by reducing or increasing the depth of the drink-through chamber 23, thereby adjusting the thickness of both the drink flap 24 and the living hinge 26. Additionally, by using a more sophisticated manufacturing technique, the thickness of the drink flap 24 and the living hinge 26 can be controlled by applying varying pressures to different segments of the material during thermo-forming. Furthermore, the resistance of the living hinge 26 to folding can be adjusted by increasing or decreasing the length of the living hinge 26, as can be visualized in FIGS. 5A and 5B. It should be noted that the sectional views presented in this disclosure fail to accurately reflect the thinning effect of molded thermo-formed plastics.

FIGS. 7 and 8 show the preferred drink flap 24 folded into an open position, as it would be if the beverage were flowing through the drink-through opening 29. When the drink flap 24 opens, the drink flap corners 28 may curl against the chamber wall 25 as shown. With the coupled spring action of the folded living hinge 26 and the curled drink flap corners 28 exerting force to return to their relaxed state, the drink flap 24 effectively closes during periods when the beverage is not being consumed. The living hinge 26 is preferably located along one of the two linear intersections at the base of the chamber wall 25. By placing the living hinge 26 at the base of the outer planar wall portion of the chamber wall 25, as shown in FIGS. 5A and 5B, the drink flap 24 opens from inward to outward, as best seen in FIGS. 7 and 8. Thus, a violently agitated beverage ejecting through the drink-through orifice 18 is redirected by the inwardly angled non-relaxed drink flap 24 into the spill reservoir 14. The preferable drink flap 24 is capable of opening into a non-relaxed position when subjected to a slight negative air pressure applied to the drink-through chamber 23 that is generated by the user when sipping the beverage. Otherwise, the drink flap 24 remains in a relaxed and closed position to restrict the flow of a moderately agitated liquid to pass through the drink-through orifice 18.

Figure 10:
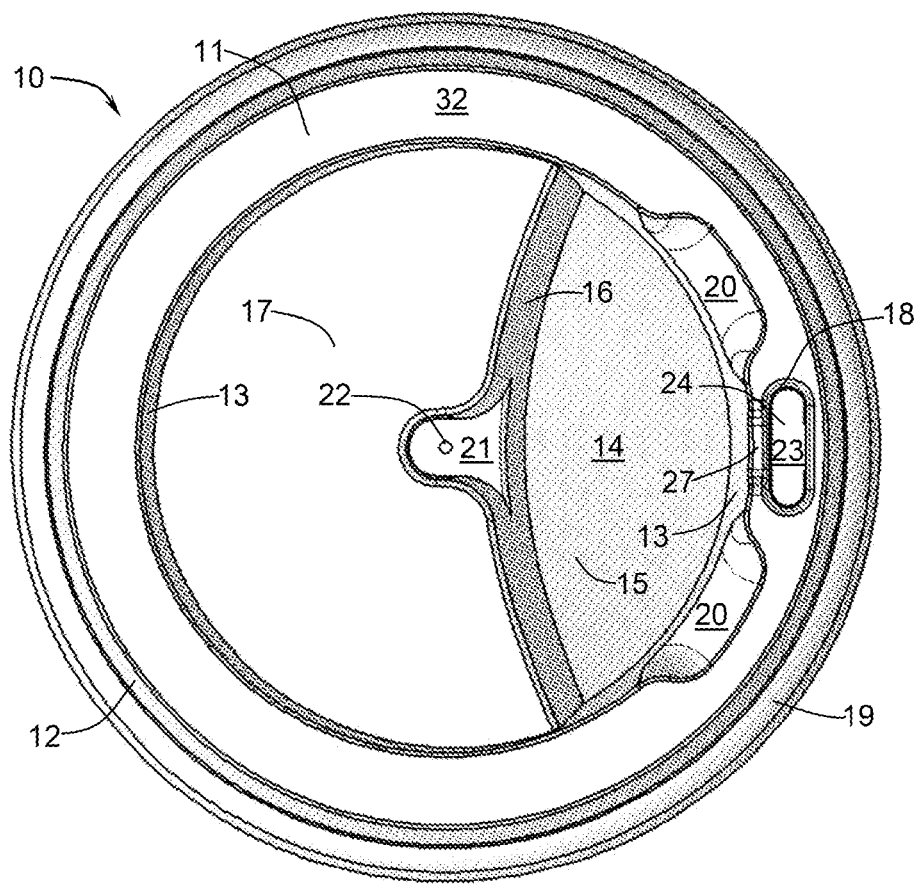
FIG. 10 is a top view illustrating the disposable cup lid shown in FIG. 1.

FIGS. 9 and 10 are top and cross-sectional side views of the dome lid 10 with all of the preferred implementations of the present invention. FIG. 9 clearly demonstrates how the base of the vent slot 21 is below the surrounding the inner top wall 17 and in fluid communication with the spill reservoir 14. FIG. 9 also shows how the downward slope of the inner top wall 17 provides additional room for the user's nose and how the deepening of the inner side wall 13 within the spill reservoir 14, provides additional room for the user's upper lip. FIG. 10 illustrates how the preferred arcuate shape of the interior side wall 16 provide further room for the user's upper lip. Also shown is the preferred venting with the centered positioning of the vent opening 22 within the vent slot 21 in fluid communication with the spill reservoir 14.

Figure 11:
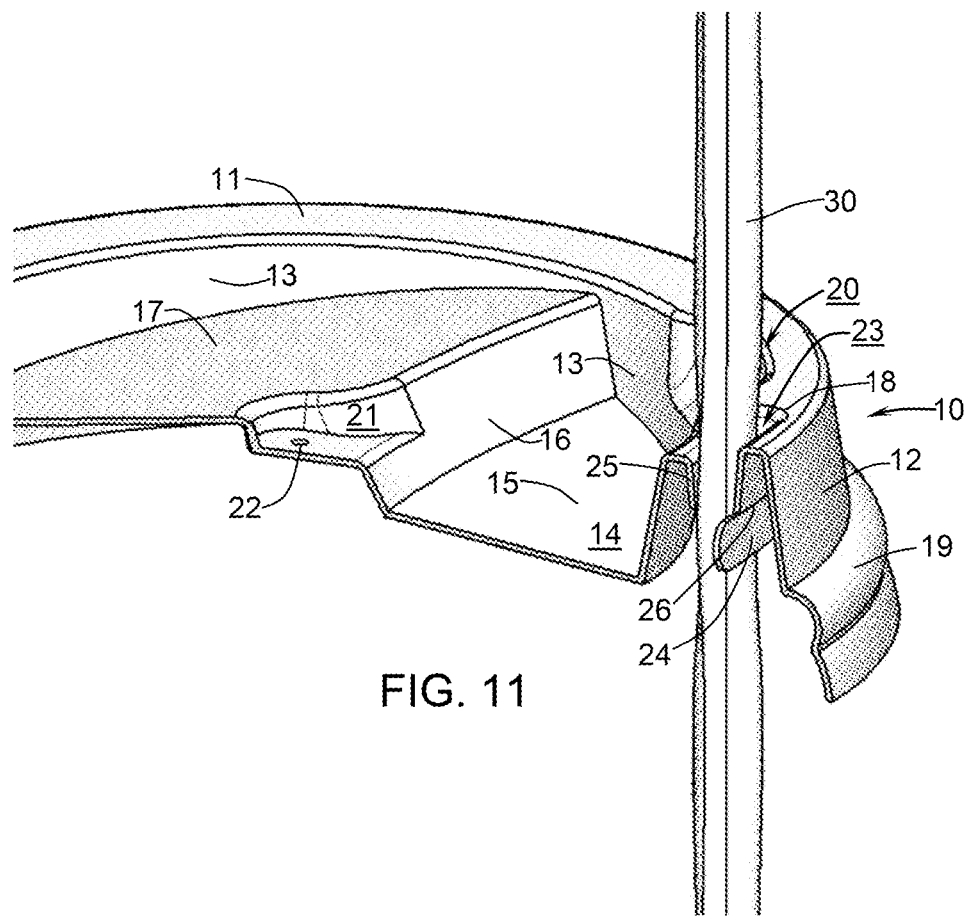
FIG. 11 is a fragmentary cross-sectional isometric view of a drinking straw inserted into the drink-through chamber.

There are occasions when a user wants to insert a drinking straw 30 through the drink-through chamber 23, as illustrated in FIG. 11. When the drinking straw 30 is inserted into the drink-through chamber 23, the drink flap 24 yields by folding downward as shown, thereby permitting the straw 30 to become fully inserted into the cup 31. Not only does the drink flap 24 fold out of the way, the drink-through chamber 23 provide additional support to the drinking straw 30 by enveloping the drinking straw 30 with the chamber wall 25. The insertion of the drinking straw 30 is may distort the living hinge 26 such that the functionality of the drink flap 24 is destroyed. However, when a user inserts the drinking straw 30, it usually is not removed until the beverage is consumed and the container is discarded.

Figure 12:
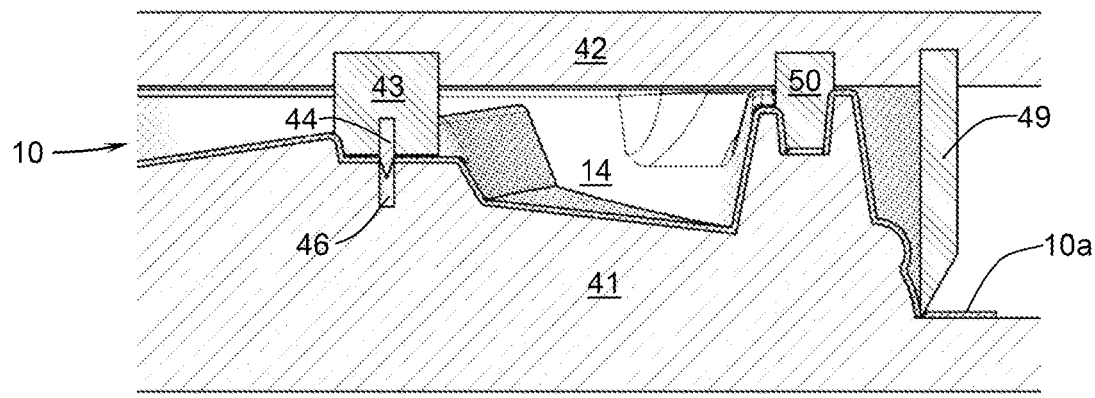
FIG. 12 is a cross-sectional side view illustrating the tooling in position for die cutting a drink flap and vent opening within a thin-walled molded cup lid.

Stamping of drink-through orifices is a common secondary process subsequent to vacuum-formation of the thermoplastic material. As shown in FIG. 12, the stamping process typically consists of an array of hardened metallic cutting tools impacting upon a mating metallic receiving surface with the thermoplastic material being supported by the receiving surface during the cutting process. In standard manufacturing of disposable dome lids, all cuts are performed simultaneously even though they are often on different horizontal planes. The cuts typically include the cutting or punching of the drink-through opening, the punching of vent and drain holes, and the cutting out of the lid itself from the thermoplastic material.

Figure 13:
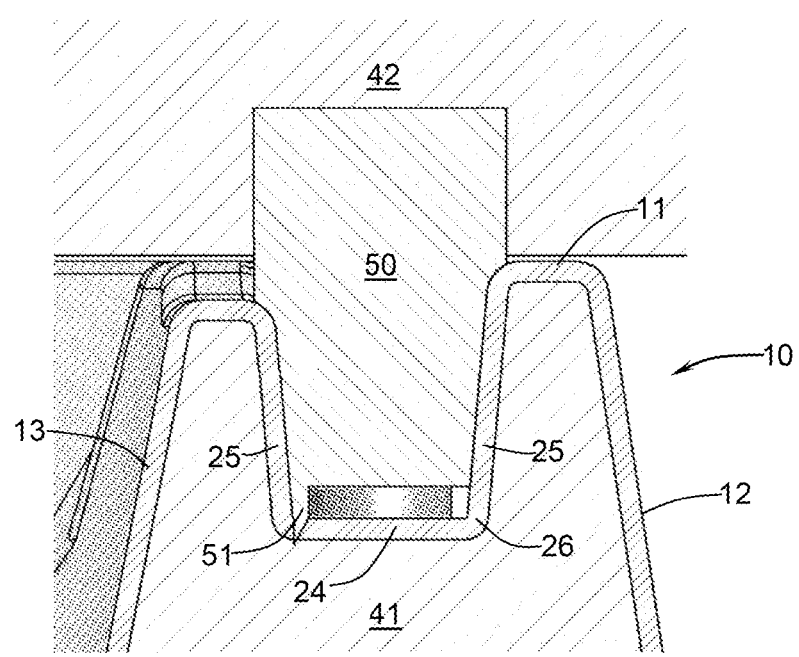
FIG. 13 is an enlarged fragmentary cross-sectional elevation view detailing the drink-through chamber block die for cutting into the drink-through chamber depicted in FIG. 12.

The present disclosure introduces a method for die cutting the drink flap 24 within the base of drink-through chamber 23 that is preferably both primarily horizontal and planar as viewed in FIG. 13. FIG. 12 not only illustrates a method for die cutting the drink flap 24, but also illustrates how the vent opening 22, the drink flap 24, and the lid 10 can all be cut simultaneously with a singular cutting stroke. A support plate 41 is typically shaped similar to the vacuum-formed lid 10. In production, the support plate 41 often serves as the mold used to form the thermoplastic material and a receiving surface to cut the thermoplastic material, thereby combining the vacuum forming process with the cutting operation. This manufacturing technique saves time and cost by eliminating the need for transferring the molded sheets from one station to the next. A mounting plate 42 aligns with the support plate 41 and holds all the cutting tools: a vent block die 43 with a needle punch 44 for cutting a small vent opening; a chamber block die 50 with a cutting blade 51 for cutting in the drink flap 24 or the drink-through opening 29; and a ring die 49 for cutting the lid 10 away from the remainder of the thermoplastic sheet 10a. When the support plate 41 holding the untrimmed cup lid 10 comes into contact with the cutting tools held by the mounting plate 42, as seen in FIG. 12, the vent opening 22 and the drink flap 24 are cut and the lid 10 is separated from the remainder of the thermoplastic sheet 10a. A receiving socket 46 within the support plate 41 allows the needle punch 44 to penetrate completely through the lid 10 for cutting the vent opening 22.

FIGS. 13 and 14A-14B illustrate more clearly the die cutting blade 51 of the chamber block die 50 for cutting in the drink flap 24. FIGS. 14A and 14B show alternative cutting blades 51 for cutting the two preferred configurations for the living hinge 26 seen in FIGS. 5A and 5B, respectively. Unlike the cutting of drink-through openings, no waste is generated by cutting in the drink flap 24, thus eliminating the cost associated with keeping the support plate 41 clear of waste build-up. Of particular interest are FIGS. 14A-14B and 15, where it can be seen that the block dies 43 and 50 have contoured portions 47 and 52 conforming to the contours of the lid 10. During the cutting process the chamber block die 50 inserts into the drink-through chamber 23 where the contoured portion 52 essentially mates with the contour of drink-through chamber 23. Likewise, the vent block die 43 inserts into vent slot 21 where the contoured portion 47 essentially mates with the contour of the vent slot 21. The contoured portions 47 and 52 enable the cutting portions, the needle punch 44 and the cutting blade 51, to be relatively short, thereby increasing their strength and durability.

Figure 6:
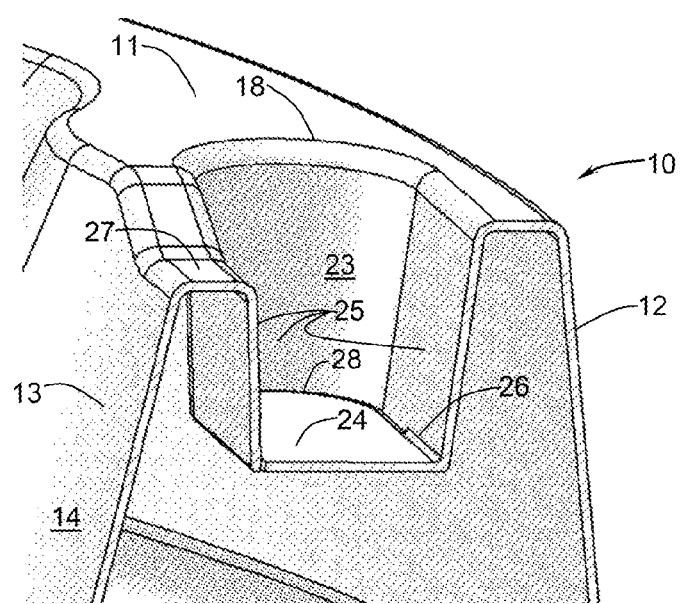
FIG. 6 is a fragmentary cross-sectional isometric view of a drink-through chamber below the drink-through orifice formed in accordance with one implementation of the present disclosure illustrating the drink flap of FIG. 5A cut into the base of the drink-through chamber.
Figure 16:
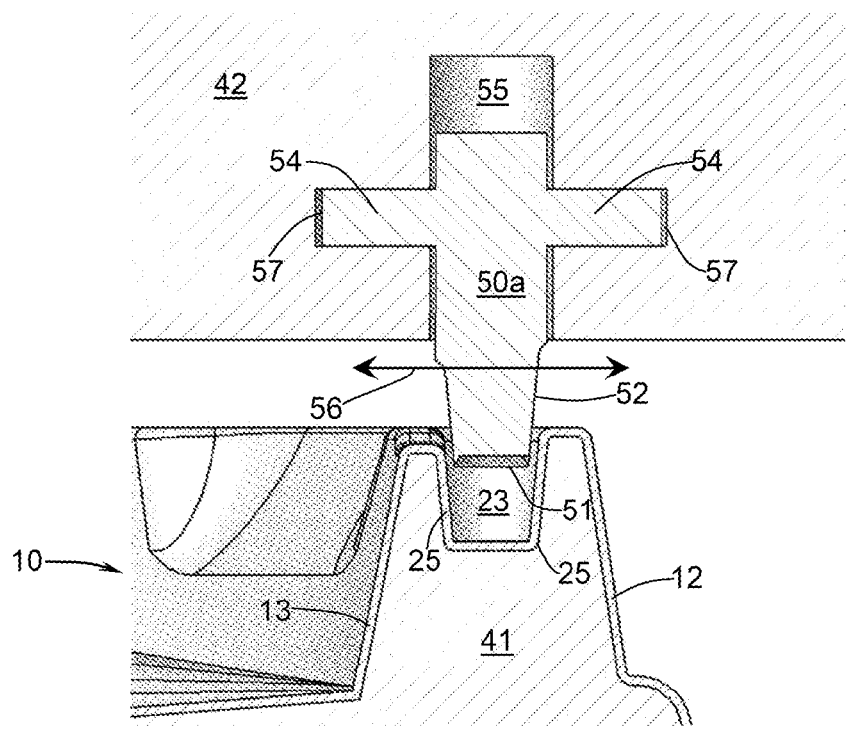
FIG. 16 is a cross-sectional side view illustrating an aligned floating block die prior to engaging with the drink-through chamber.
Figure 17:
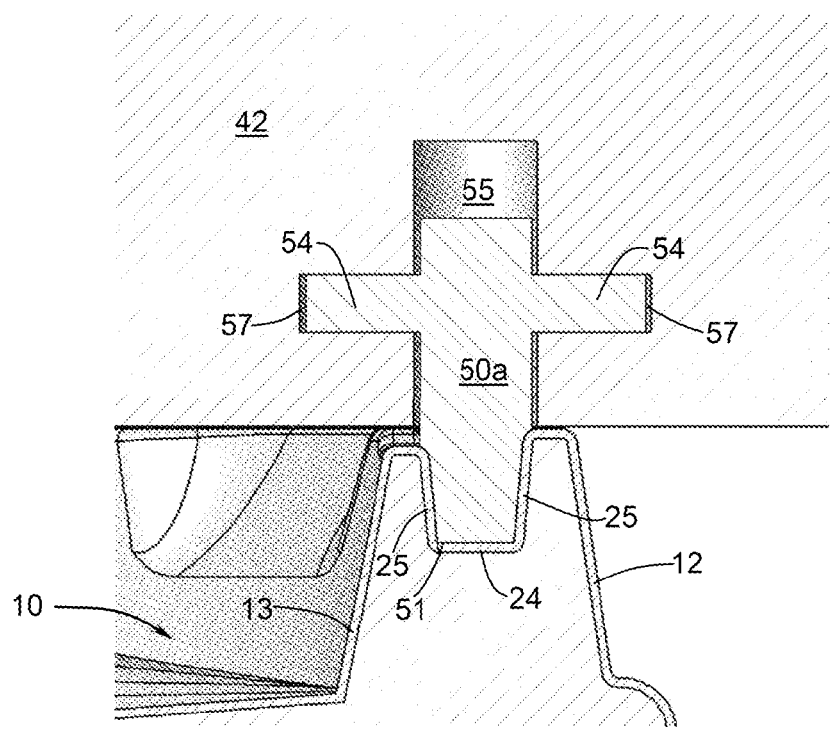
FIG. 17 is a cross-sectional side view of the floating block die fully engaged with the drink-through chamber and cutting into the drink-through chamber.
Figure 18:
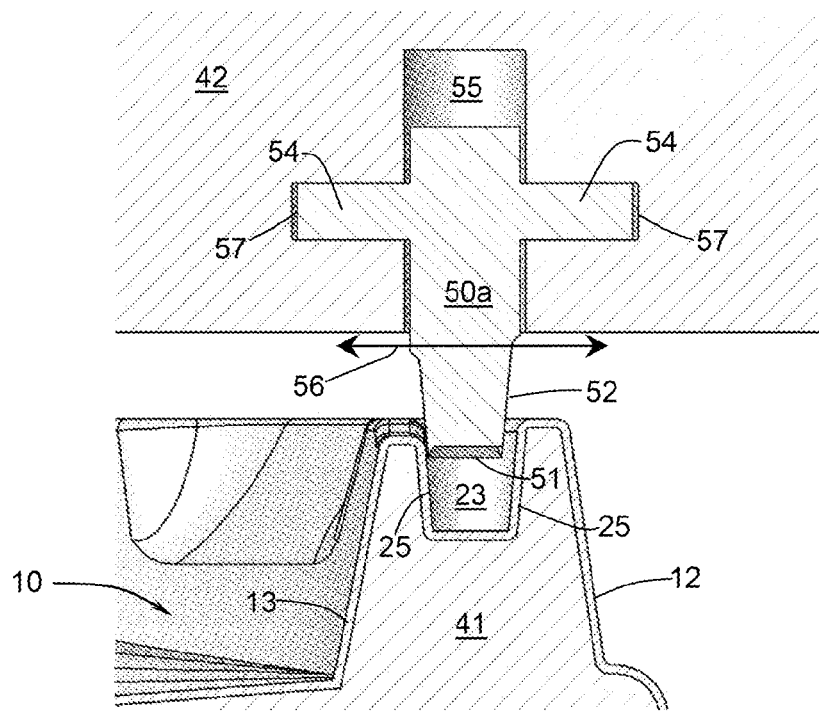
FIG. 18 is the tooling depicted in FIG. 16 but where the floating block die is slightly misaligned with the drink-through chamber.
Figure 19:
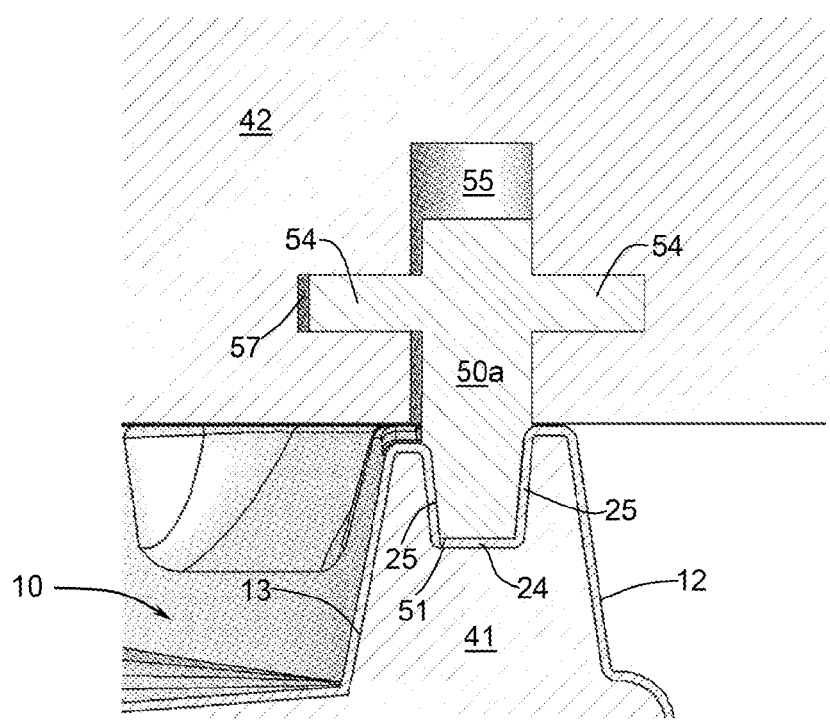
FIG. 19 is the tooling depicted in FIG. 18 showing the floating block die aligning with the drink-through chamber upon engaging with and cutting into the drink-through chamber.
Figure 20:
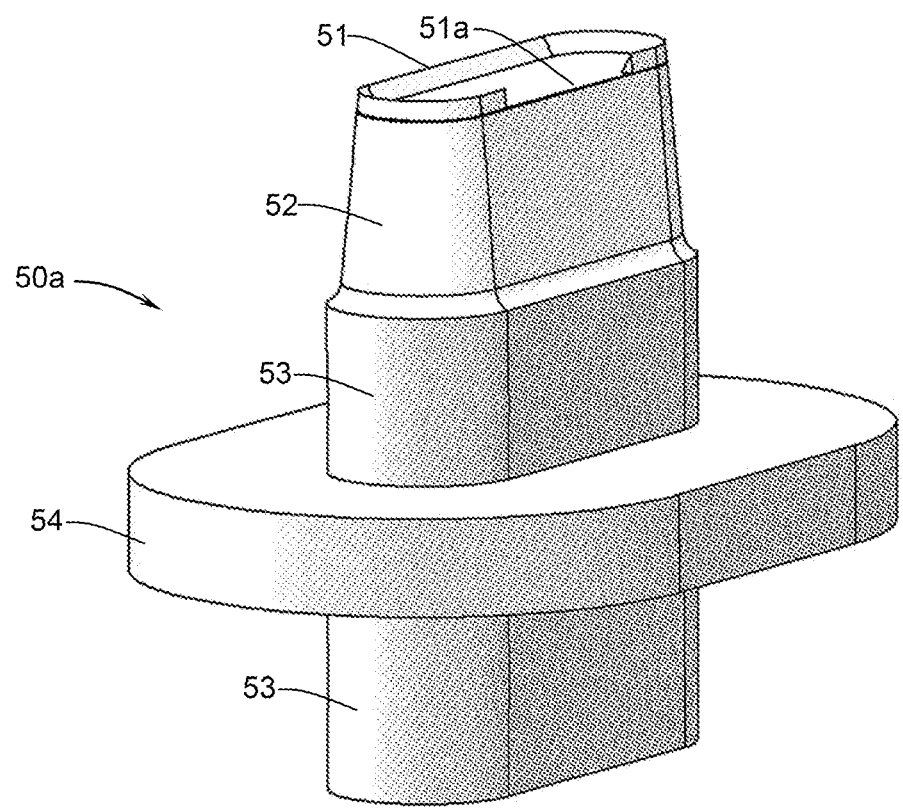
FIG. 20 is an isometric view of the floating block die depicted in FIGS. 16, 17, 18 and 19.

The manufacturing of a typical disposable dome lid does not require precision positioning for cutting drink and vent openings, including the cutting out of the lid. Usually, lids are designed to permit a loose tolerance by providing sufficient area surrounding all required cut features. However, the cutting of drink flap 24 within drink-through chamber 23 requires a precise alignment between the chamber block die 50 and the support plate 41, if the drink flap 24 is to be cut along the base of the chamber wall 25 as shown in FIGS. 6 and 9. The likelihood of tooling misalignment becomes an issue when a large number of the lids 10 are simultaneously die-cut from a single sheet during production. FIGS. 16 and 17 illustrate a floating block die 50a similar to the chamber block die 50 except having a block die flange 54 that is horizontal and surrounds a block die body 53, best viewed in FIG. 20. The mounting plate 42 includes a die chamber 55 for holding the floating block die 50a. The die chamber 55 is further defined by a mounting slot 57 that is also horizontal and radially surrounds the die chamber 55. The floating block die 50a is supported within the die chamber 55 by the block die flange 54 which inserts into the mounting slot 57. The floating block die 50a is capable of lateral movement 56 because of space provided between vertical surfaces within the die chamber 55. The floating block die 50a is restricted from vertical movement within die chamber 55 because of the restricted clearance between horizontal contacting surfaces within the mounting slot 57. If the floating block die 50a is aligned with the drink-through chamber 23, as shown in FIG. 16, there will be no lateral movement 56 during the cutting process as shown in FIG. 17. However, if a minor misalignment exists between the floating block die 50a and the drink-through chamber 23, the contoured portion 52 of the floating block die 50a contacts a vertical portion of the chamber wall 25 prior to die cutting a horizontal portion of the chamber wall 25, as shown in FIG. 18. As the floating block die 50a continues its insertion into the drink-through chamber 23, the downwardly and inwardly sloping chamber wall 25 exerts a lateral force to the floating block die 50a, thereby causing the floating block die 50a to move laterally into the proper alignment for cutting, as shown in FIG. 19.

Figure 21:
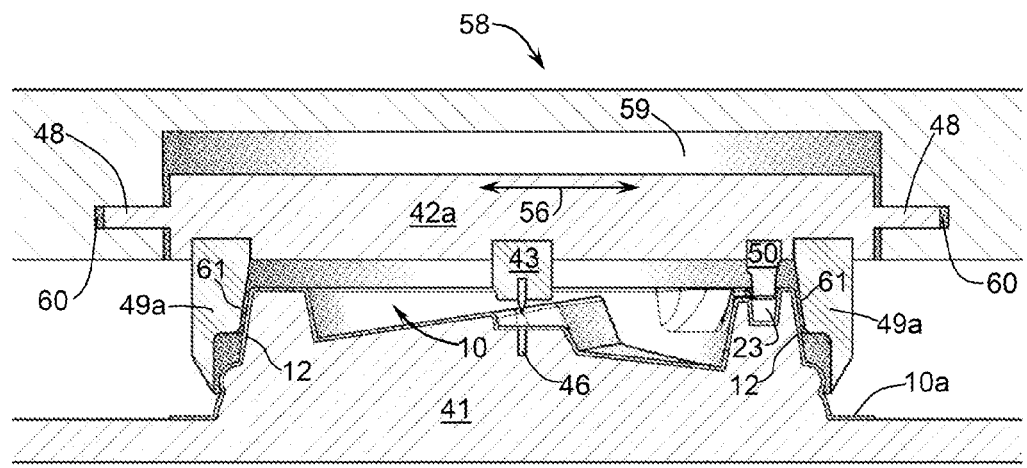
FIG. 21 is a cross-sectional side view illustrating a floating mounting plate with mounted cutting tools in position for die cutting a thin-walled molded cup lid.
Figure 22:
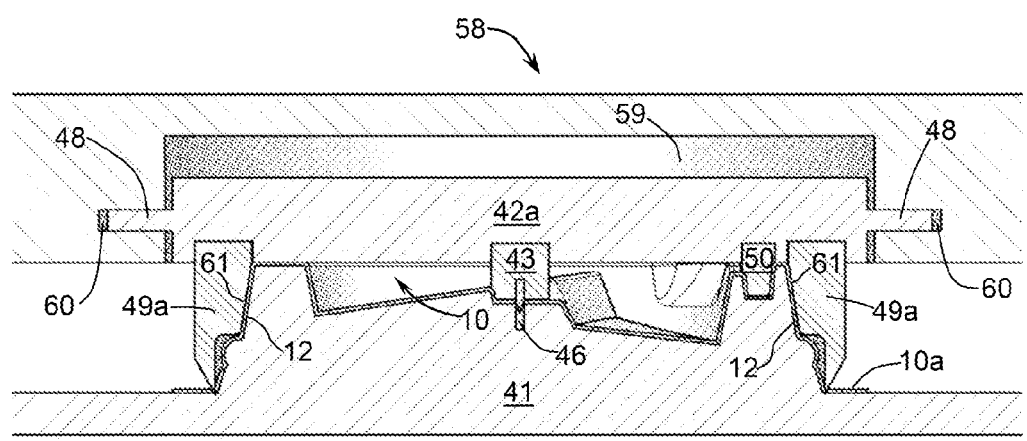
FIG. 22 is a cross-sectional side view of FIG. 21 with the cutting tools engaged in die cutting a thin-walled molded cup lid.
Figure 23:
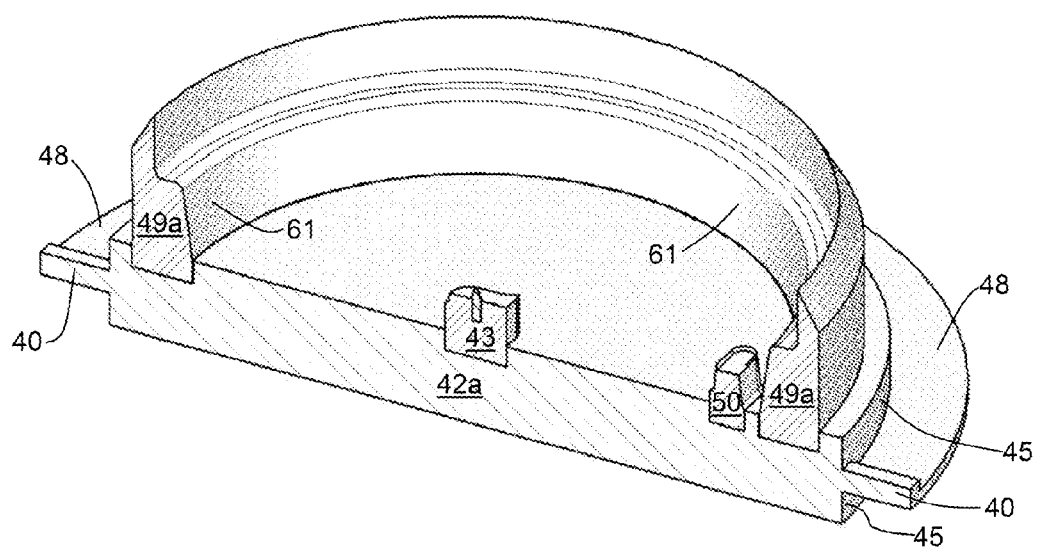
FIG. 23 is a cross-sectional isometric view of the floating mounting plate with mounted cutting tools for die cutting a thin-walled molded cup lid.

Another method for self-aligning cutting dies with the thermo-formed disposable dome cup lid 10 introduces a separate floating mounting plate 42a for each cup lid 10, as shown in FIGS. 21 and 22. A mounting plate base 58 holds an array of similar floating mounting plates 42a that align with the support plate 41. The floating mounting plate 42a includes a mounting plate flange 48 that is horizontal and surrounds the mounting plate side wall 45, best viewed in FIG. 23. A contoured ring die 49a is mounted to the floating mounting plate 42a for separating the lid 10 from the remainder of the thermoplastic material 10a. In a preferred configuration the floating mounting plate 42a also contains all cutting tools for cutting each cup lid 10, including the chamber block die 50 and the vent block die 43. A contoured portion 61 of the contoured ring die 49a aligns with the outer side wall 12 of the just-formed cup lid 10. The floating mounting plate 42a is mounted within a mounting plate chamber 59 in the mounting plate base 58. The mounting plate chamber 59 is further defined by a mounting plate slot 60. The floating mounting plate 42a is supported within the mounting plate chamber 59 by the mounting plate flange 48 which inserts into the mounting plate slot 60. The floating mounting plate 42a is capable of lateral movement 56 because of space provided between vertical surfaces within the mounting plate chamber 59. The floating mounting plate 42a is restricted from vertical movement within mounting plate chamber 59 because of the restricted clearance between horizontal contacting surfaces within the mounting plate slot 60. The floating mounting plate 42a is restricted from rotational movement within the mounting plate base 58 by one or more flange tabs 40 shown in FIG. 23. Rotational alignment is required if the floating mounting plate 42a includes cutting tools within the interior of the contoured ring die 49a. If the floating mounting plate 42a is aligned with the lid 10 as shown in FIG. 21, there will be no lateral movement 56 during the cutting process. However, if a minor misalignment exists between the floating mounting plate 42a and the cup lid 10 (not illustrated), the contoured portion 61 of the floating mounting plate 42a contacts the outer side wall 12 of the formed cup lid 10 prior to die cutting. As the cup lid 10 inserts into the misaligned contoured ring die 49a, the mating of the outer side wall 12 with the contoured portion 61 results in a lateral force being applied to the floating mounting block 42a thereby causing the floating mounting plate 42a to move laterally 56 into the proper alignment for all cuts including separating the cup lid 10 from the remainder of the thermoplastic sheet 10a, as shown in FIG. 22.

These described methods are particularly useful for making cuts within deeper cavities that require a precision tolerance. By implementing one or more of the described methods, the precise alignment for cutting into the contours of the formed thermoplastic sheet can be achieved by the self-guided motion of the cutting tools. When deviations measured in tenths of a millimeter are a concern, maintaining proper alignment becomes an issue in production where a large array of cutting tools are simultaneously cutting a multitude of disposable cup lids.

The various implementations described above can be combined to provide further implementations. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A lid that mounts on a cup for containing a beverage, the lid occupying a volume above a top of the cup, the lid comprising:
   a mounting portion capable of anchoring on the cup;
   an outer side wall extending upwardly from the mounting portion and terminating at a top;
   an inner side wall extending downwardly from the top;
   the inner and outer side walls and the top combining to define a drink ridge;
   an inner top wall below the top and at least partially bounded by the inner side wall;
   a drink-through orifice in the drink ridge, that encircles a drink-through opening and enables drinking from the cup without removal of the lid, the drink ridge enabling lower and upper lips of a user to encompass the drink-through orifice with the lower lip of the user engaging with the outer side wall and the upper lip of the user engaging with the inner side wall during consumption of the beverage;
   a drink chamber within the drink ridge, the think chamber having an open top and a circumscribing chamber side wall extending downwardly from the drink-through orifice and terminating at a chamber bottom;
   the chamber side wall comprising a pair of opposing planar portions meeting with a pair of opposing arcuate portions at four locations each of which is identified as a juncture;
   a drink flap formed into the chamber bottom, the drink flap having a relaxed position when closed and a non-relaxed position when open to provide a drink-through opening;
   the drink flap in the relaxed position when the cup is predominantly upright, thereby restricting the exiting of the beverage through the drink-through orifice when the beverage sloshes;
   the drink flap including a hinge portion enabling the drink flap to fold into the non-relaxed position when subjected to a relatively weak negative air pressure applied to the drink-through orifice generated by the user during consumption of the beverage thereby allowing the beverage to pass through the drink-through orifice with the cup in a tilted position:
   the hinge portion connecting the drink flap to one of the planar portions of the chamber side wall;
   the hinge portion comprising a pair of hinges with each defining an outer edge and an inner edge, wherein the outer edge of each hinge terminates at one of the junctures shared by a planar portion; and
   the distance between the outer edge and the inner edge of each hinge is less than the distance between the inner edges of the pair of hinges.

2. The lid of claim 1, the lid further defined by:
   an orifice ridge defined by the inner side wall and a portion of the top that includes the drink-through orifice;
   a first segment of the drink-through orifice occupying the orifice ridge;
   a second segment of the drink-through orifice defining the remainder of the drink-through orifice; and
   the first segment recessed below the second segment thereby directing the beverage having a frothed portion bubbling up through the drink-through orifice, to flow over the orifice ridge and onto the inner side wall when the cup is predominantly upright.

3. The lid of claim 1, the lid further defined by:
   the mounting portion having an annular perimeter, the perimeter defining a vertical central axis of the lid; and
   a vent opening aligned with the vertical central axis, the vent opening configured to vent air into the cup during consumption of the beverage.

4. The lid of claim 1, wherein the inner top wall is further defined by a primarily planar wall portion sloping downwardly away from the drink-through orifice to provide a lower area of the inner top wall, the primarily planar wall portion configured to provide additional room for the user's nose during consumption of the beverage.

5. The lid of claim 1, the lid further comprising:
   an interior side wall extending downwardly from the inner top wall and laterally bounded by the inner side wall;
   a spill reservoir defined by the inner side wall and the interior side wall; and
   the spill reservoir configured to enable the upper lip of the user to engage with a portion of the inner side wall within the spill reservoir during consumption of the beverage.

6. The lid of claim 5, the lid further defined by:
   an orifice ridge defined by the inner side wall and a portion of the top that includes the drink-through orifice;
   a first segment of the drink-through orifice occupying the orifice ridge;
   a second segment of the drink-through orifice defining the remainder of the drink-through orifice; and
   the first segment recessed below the second segment thereby directing the beverage having a frothed portion bubbling up through the drink-through opening, to flow over the orifice ridge and into the spill reservoir when the cup is predominantly upright.

7. The lid of claim 5, the lid further defined by:
   the mounting portion having an annular perimeter, the perimeter defining a vertical central axis of the lid;
   a vent opening aligned with the vertical central axis, the vent opening configured to vent air into the cup during consumption of the beverage;
   the vent opening at a base of a vent slot, the vent slot recessed within the inner top wall and occupying a portion of the interior side wall; and
   the vent slot configured to direct fluid exiting the vent opening into the spill reservoir when the cup is predominantly upright.

8. The lid of claim 5, wherein the drink ridge includes a pair of beveled recesses within a portion of the inner side wall, each of the beveled recesses positioned on a respective side of the drink-through orifice and configured to engage with the upper lip of the user during consumption of the beverage.

9. The lid of claim 1, the lid further comprising:
an interior side wall extending downwardly from the inner top wall and laterally bounded by the inner side wall;
a spill reservoir defined by the inner side wall and the interior side wall, the interior side wall aligned with the portion of the inner side wall occupied by the spill reservoir and approximately centered with the drink-through orifice;
the spill reservoir including a bottom wall bounded by the inner side wall and the interior side wall, the interior side wall sloping upwardly and inwardly at a steeper angle than the bottom wall, and terminating at the inner top wall;
the spill reservoir configured to enable the upper lip of the user to engage with a portion of the inner side wall within the spill reservoir during consumption of the beverage; and
the interior side wall having an arcuate curvature, the arcuate curvature curving away from the drink-through orifice, thereby providing additional space for the upper lip of the user.

10. A lid that mounts on a cup for containing a beverage, the lid occupying a volume above a top of the cup, the lid comprising:
a mounting portion capable of anchoring on the cup;
an outer side wall extending upwardly from the mounting portion and terminating at a top;
an inner side wall extending downwardly from the top;
the inner and outer side walls and the top combining to define a drink ridge;
an inner top wall below the top and at least partially bounded by the inner side wall;
a drink-through orifice in the drink ridge, that encircles a drink-through opening and enables drinking from the cup without removal of the lid, the drink ridge enabling lower and upper lips of a user to encompass the drink-through orifice with the lower lip of the user engaging with the outer side wall and the upper lip of the user engaging with the inner side wall during consumption of the beverage;
an orifice ridge defined by the inner side wall and a portion of the top that includes the drink-through orifice;
a first segment of the drink-through orifice occupying the orifice ridge;
a second segment of the drink-through orifice defining the remainder of the drink-through orifice; and
the first segment recessed below the second segment thereby directing the beverage having a frothed portion bubbling up through the drink-through opening, to flow over the orifice ridge and onto the inner side wall when the cup is predominantly upright.

11. The lid of claim 10, the lid further defined by:
a drink chamber within the drink ridge, the drink chamber having an open top and a circumscribing chamber side wall extending downwardly from the drink-through orifice and terminating at a bottom;
the drink chamber comprising a drink flap in a chamber bottom; and
the drink flap having a relaxed position and a non-relaxed position, and capable of opening in the non-relaxed position when subjected to a negative air pressure applied to the drink-through orifice generated by the user during consumption of the beverage, thereby providing the drink-through opening and allowing the beverage to pass through the drink-through orifice with the cup in a tilted position, and to be in the relaxed position when the cup is predominantly upright, thereby restricting the exiting of the beverage through the drink-through orifice when the beverage sloshes.

12. The lid of claim 10, the lid further defined by:
the mounting portion having an annular perimeter, the perimeter defining a vertical central axis of the lid; and
a vent opening aligned with the vertical central axis positioned approximately at the center of the lid, the vent opening configured to vent air into the cup during consumption of the beverage.

13. The lid of claim 10, wherein the inner top wall is further defined by a primarily planar wall portion sloping downwardly away from the drink-through orifice to provide a lower area of the inner top wall, the primarily planar wall portion configured to provide additional room for the user's nose during consumption of the beverage.

14. The lid of claim 10, the lid further comprising a chamber side wall extending downwardly from the drink-through orifice to form a drink chamber, and a base of the chamber side wall defining the drink-through opening.

15. The lid of claim 10, the lid further comprising:
an interior side wall extending downwardly from the inner top wall and laterally bounded by the inner side wall;
a spill reservoir defined by the inner side wall and the interior side wall;
the spill reservoir configured to enable the upper lip of the user to engage with a portion of the inner side wall within the spill reservoir during consumption of the beverage; and
the first segment of the drink-through orifice directing the beverage having a frothed portion bubbling up through the drink-through opening, to flow over the orifice ridge and into the spill reservoir when the cup is predominantly upright.

16. The lid of claim 15, the lid further defined by:
the mounting portion defining a an annular perimeter, the perimeter defining a center of the lid;
a vent opening within the inner top wall and positioned approximately at the center of the lid, the vent opening configured to vent air into the cup during consumption of the beverage;
the vent opening at a base of a vent slot, the vent slot recessed within the inner top wall and occupying a portion of the interior side wall; and
the vent slot configured to direct fluid exiting the vent opening into the spill reservoir when the cup is predominantly upright.

17. The lid of claim 15, wherein the drink ridge includes a pair of beveled recesses within a portion of the inner side wall, each of the beveled recesses positioned on a respective side of the drink-through orifice and configured to engage with the upper lip of the user during consumption of the beverage.

18. The lid of claim 15, wherein
the spill reservoir includes a bottom wall bounded by the inner side wall and the interior side wall, the interior side wall sloping upwardly and inwardly at a steeper angle than the bottom wall, and terminating at the inner top wall; and
the interior side wall having an arcuate curvature, the arcuate curvature curving away from the drink-through orifice, thereby providing additional space for the upper lip of the user.

19. The lid of claim 11, the lid further defined by:
the mounting portion having an annular perimeter, the perimeter defining a vertical central axis of the lid; and
a vent opening aligned with the vertical central axis positioned approximately at the center of the lid, the vent opening configured to vent air into the cup during consumption of the beverage.

20. The lid of claim 11, wherein the inner top wall is further defined by a primarily planar wall portion sloping downwardly away from the drink-through orifice to provide a lower area of the inner top wall, the primarily planar wall portion configured to provide additional room for the user's nose during consumption of the beverage.

21. The lid of claim 11, the lid further comprising:
an interior side wall extending downwardly from the inner top wall and laterally bounded by the inner side wall;
a spill reservoir defined by the inner side wall and the interior side wall;
the spill reservoir configured to enable the upper lip of the user to engage with a portion of the inner side wall within the spill reservoir during consumption of the beverage; and
the first segment of the drink-through orifice directing the beverage having a frothed portion bubbling up through the drink-through opening, to flow over the orifice ridge and into the spill reservoir when the cup is predominantly upright.

22. The lid of claim 14, the lid further defined by:
the mounting portion having an annular perimeter, the perimeter defining a vertical central axis of the lid; and
a vent opening aligned with the vertical central axis positioned approximately at the center of the lid, the vent opening configured to vent air into the cup during consumption of the beverage.

23. The lid of claim 14, wherein the inner top wall is further defined by a primarily planar wall portion sloping downwardly away from the drink-through orifice to provide a lower area of the inner top wall, the primarily planar wall portion configured to provide additional room for the user's nose during consumption of the beverage.

24. The lid of claim 14, the lid further defined by:
an interior side wall extending downwardly from the inner top wall and laterally bounded by the inner side wall;
a spill reservoir defined by the inner side wall and the interior side wall;
the spill reservoir configured to enable the upper lip of the user to engage with a portion of the inner side wall within the spill reservoir during consumption of the beverage; and
the first segment of the drink-through orifice directing the beverage having a frothed portion bubbling up through the drink-through opening, to flow over the orifice ridge and into the spill reservoir when the cup is predominantly upright.

25. The lid of claim 9, the lid further defined by:
an orifice ridge defined by the inner side wall and a portion of the top that includes the drink-through orifice;
a first segment of the drink-through orifice occupying the orifice ridge;
a second segment of the drink-through orifice defining the remainder of the drink-through orifice; and
the first segment recessed below the second segment thereby directing the beverage having a frothed portion bubbling up through the drink-through opening, to flow over the orifice ridge and into the spill reservoir when the cup is predominantly upright.

26. The lid of claim 25, wherein the inner top wall is further defined by a primarily planar wall portion sloping downwardly away from the drink-through orifice to provide a lower area of the inner top wall, the primarily planar wall portion configured to provide additional room for the user's nose during consumption of the beverage.

27. The lid of claim 26, wherein the drink ridge includes a pair of beveled recesses within a portion of the inner side wall, each of the beveled recesses positioned on a respective side of the drink-through orifice and configured to engage with the upper lip of the user during consumption of the beverage.

28. The lid of claim 27, the lid further defined by:
the mounting portion having an annular perimeter, the perimeter defining a vertical central axis of the lid;
a vent opening aligned with the vertical central axis, the vent opening configured to vent air into the cup during consumption of the beverage;
the vent opening at a base of a vent slot, the vent slot recessed within the inner top wall and occupying a portion of the interior side wall; and
the vent slot configured to direct fluid exiting the vent opening into the spill reservoir when the cup is predominantly upright.

29. The lid of claim 24, wherein the inner top wall is further defined by a primarily planar wall portion sloping downwardly away from the drink-through orifice to provide a lower area of the inner top wall, the primarily planar wall portion configured to provide additional room for the user's nose during consumption of the beverage.

30. The lid of claim 29, wherein the drink ridge includes a pair of beveled recesses within a portion of the inner side wall, each of the beveled recesses positioned on a respective side of the drink-through orifice and configured to engage with the upper lip of the user during consumption of the beverage.

31. The lid of claim 30, the lid further defined by:
the mounting portion having an annular perimeter, the perimeter defining a vertical central axis of the lid;
a vent opening aligned with the vertical central axis, the vent opening configured to vent air into the cup during consumption of the beverage;
the vent opening at a base of a vent slot, the vent slot recessed within the inner top wall and occupying a portion of the interior side wall; and
the vent slot configured to direct fluid exiting the vent opening into the spill reservoir when the cup is predominantly upright.

32. A lid that mounts on a cup for containing a beverage, the lid occupying a volume above a top of the cup, the lid comprising:
a mounting portion capable of anchoring on the cup;
an outer side wall extending upwardly from the mounting portion and terminating at a top;
an inner side wall extending downwardly from the top;
the inner and outer side walls and the top combining to define a drink ridge;
an inner top wall below the top and at least partially bounded by the inner side wall;
a drink-through orifice in the drink ridge, that encircles a drink-through opening and enables drinking from the cup without removal of the lid, the drink ridge enabling lower and upper lips of a user to encompass the drink-through orifice with the lower lip of the user engaging with the outer side wall and the upper lip of the user engaging with the inner side wall during consumption of the beverage;

the mounting portion having an annular perimeter, the perimeter defining a vertical central axis of the lid;

a vent opening aligned with the vertical central axis, the vent opening configured to vent air into the cup during consumption of the beverage;

an interior side wall extending downwardly from the inner top wall and laterally bounded by the inner side wall;

a spill reservoir defined by the inner side wall and the interior side wall;

the spill reservoir configured to enable the upper lip of the user to engage with a portion of the inner side wall within the spill reservoir during consumption of the beverage;

the vent opening at a base of a vent slot, the vent slot recessed within the inner top wall and occupying a portion of the interior side wall; and the vent slot configured to direct fluid exiting the vent opening into the spill reservoir when the cup is predominantly upright.

33. The lid of claim 32, the lid further defined by:

a drink chamber within the drink ridge, the drink chamber having an open top and a circumscribing chamber wall extending downwardly from the drink-through orifice and terminating at a bottom;

the drink chamber including a drink flap; and the drink flap having a relaxed position and a non-relaxed position, and capable of opening into the non-relaxed position when subjected to a negative air pressure applied to the drink-through orifice generated by the user during consumption of the beverage, thereby providing the drink-through opening and allowing the beverage to pass through the drink-through orifice with the cup in a tilted position, and to be in the relaxed position when the cup is predominantly upright, thereby restricting the exiting of the beverage through the drink-through orifice when the beverage sloshes.

34. The lid of claim 32, the lid further defined by:

an orifice ridge defined by the inner side wall and a portion of the top that includes the drink-through orifice;

a first segment of the drink-through orifice occupying the orifice ridge;

a second segment of the drink-through orifice defining the remainder of the drink-through orifice; and the first segment recessed below the second segment thereby directing the beverage having a frothed portion bubbling up through the drink-through opening, to flow over the orifice ridge and onto the inner side wall when the cup is predominantly upright.

35. The lid of claim 32, wherein the inner top wall is further defined by a primarily planar wall portion sloping downwardly away from the drink-through orifice to provide a lower area of the inner top wall, the primarily planar wall portion configured to provide additional room for the user's nose during consumption of the beverage.

36. The lid of claim 32, wherein the drink ridge includes a pair of beveled recesses within a portion of the inner side wall, each of the beveled recesses positioned on a respective side of the drink-through orifice and configured to engage with the upper lip of the user during consumption of the beverage.

* * * * *